(12) United States Patent
Hatanaka et al.

(10) Patent No.: US 8,043,992 B2
(45) Date of Patent: Oct. 25, 2011

(54) INORGANIC MIXED OXIDE AND CATALYST FOR PURIFICATION OF EXHAUST GAS USING THE SAME

(75) Inventors: Miho Hatanaka, Aichi-gun (JP); Toshitaka Tanabe, Aichi-gun (JP); Naoki Takahashi, Nagoya (JP); Takeru Yoshida, Toyota (JP); Yuki Aoki, Nisshin (JP)

(73) Assignees: Kabushiki Kaisha Toyota Chuo Kenkyusho, Aichi-Gun (JP); Toyota Jidosha Kabushiki Kaisha, Toyota (JP); Cataler Corporation, Kakegawa-shi (JP)

( * ) Notice: Subject to any disclaimer, the term of this patent is extended or adjusted under 35 U.S.C. 154(b) by 0 days.

(21) Appl. No.: 12/682,844

(22) PCT Filed: Oct. 17, 2008

(86) PCT No.: PCT/JP2008/068900
§ 371 (c)(1),
(2), (4) Date: Apr. 13, 2010

(87) PCT Pub. No.: WO2009/057468
PCT Pub. Date: May 7, 2009

(65) Prior Publication Data
US 2010/0227757 A1 Sep. 9, 2010

(30) Foreign Application Priority Data

Oct. 31, 2007 (JP) ................................. 2007-283504

(51) Int. Cl.
*B01J 23/00* (2006.01)
*B01J 21/00* (2006.01)
*B01J 20/00* (2006.01)

(52) U.S. Cl. ........ 502/327; 502/302; 502/303; 502/304; 502/328; 502/332; 502/341; 502/349; 502/355; 502/415; 502/439; 423/594.12; 423/594.16; 423/600; 423/608; 423/625; 428/402; 428/403

(58) Field of Classification Search ................. 502/302, 502/303, 304, 327, 328, 332, 341, 349, 355, 502/415, 439; 423/594.12, 594.16, 600, 423/608, 625; 428/402, 403
See application file for complete search history.

(56) References Cited

U.S. PATENT DOCUMENTS 5,914,287 A * 6/1999 Saito et al. .................... 501/152
(Continued)

FOREIGN PATENT DOCUMENTS
EP 1 911 514 A1 4/2008
(Continued)

OTHER PUBLICATIONS

International Search Report for International Application No. PCT/JP2008/068900, mailed on Nov. 18, 2008 (w/ English translation).

*Primary Examiner* — Cam N. Nguyen
(74) *Attorney, Agent, or Firm* — Oliff & Berridge, PLC

(57) ABSTRACT

A particulate inorganic mixed oxide comprising: aluminum; zirconium; cerium; lanthanum and an additional element selected from the group consisting of neodymium and praseodymium, wherein the inorganic mixed oxide has at least 80% of primary particles with article diameters of 100 nm or less, and at least a part of the primary particles have an enriched surface region where the additional element is locally increased in a surface layer portion thereof.

6 Claims, 21 Drawing Sheets

U.S. PATENT DOCUMENTS

| | | | |
|---|---|---|---|
| 6,335,083 B1 * | 1/2002 | Kasai et al. | 428/143 |
| 6,511,739 B2 * | 1/2003 | Kasai et al. | 428/325 |
| 6,544,647 B1 * | 4/2003 | Hayashi et al. | 428/403 |
| 6,710,004 B2 * | 3/2004 | Stamires et al. | 502/84 |
| 6,762,147 B2 * | 7/2004 | Morikawa et al. | 502/242 |
| 6,933,259 B2 * | 8/2005 | Hatanaka et al. | 502/240 |
| 7,625,836 B2 * | 12/2009 | Matsueda et al. | 502/325 |
| 7,632,477 B2 * | 12/2009 | Takao et al. | 423/263 |
| 7,820,124 B1 * | 10/2010 | Krishna et al. | 423/263 |
| 2006/0052243 A1 * | 3/2006 | Muhammed et al. | 502/304 |
| 2006/0172885 A1 * | 8/2006 | Shimazu et al. | 502/304 |
| 2007/0104950 A1 | 5/2007 | Morikawa et al. | |
| 2008/0090722 A1 | 4/2008 | Tanabe et al. | |
| 2009/0048101 A1 * | 2/2009 | Takeshima et al. | 502/304 |
| 2009/0149321 A1 | 6/2009 | Morikawa et al. | |

FOREIGN PATENT DOCUMENTS

| | | |
|---|---|---|
| JP | A-2004-141781 | 5/2004 |
| JP | A-2005-104799 | 4/2005 |
| JP | A-2006-35018 | 2/2006 |
| JP | A-2006-35019 | 2/2006 |
| JP | A-2006-36556 | 2/2006 |
| JP | A-2006-55836 | 3/2006 |
| JP | A-2006-297260 | 11/2006 |
| JP | A-2006-346586 | 12/2006 |
| JP | A-2007-105571 | 4/2007 |
| JP | A-2007-331992 | 12/2007 |
| WO | WO 2006/009321 A1 | 1/2006 |
| WO | WO 2006/009327 A1 | 1/2006 |

* cited by examiner

US 8,043,992 B2

INORGANIC MIXED OXIDE AND CATALYST FOR PURIFICATION OF EXHAUST GAS USING THE SAME

TECHNICAL FIELD

The present invention relates to an inorganic mixed oxide and a catalyst for purification of exhaust gas using the same.

BACKGROUND OF THE INVENTION

Conventionally, various catalysts for purification of exhaust gas have been used for the purpose of purification of exhaust gas emitted from internal combustion engines and the like. Such catalysts for purification of exhaust gas are used under conditions of high temperature. For this reason, such catalysts for purification of exhaust gas are desired to have such a high level of heat resistance that the catalytic activity can be kept high even after long-time use at a high temperature. In this connection, in order to cause such catalysts for purification of exhaust gas to exhibit a higher heat resistance, various supports and the like have been studied.

For example, Japanese Unexamined Patent Application Publication No. 2006-36556 (Document 1) discloses a particulate inorganic oxide comprising: an aluminum oxide; a metal oxide forming no composite oxide with the aluminum oxide; and an additional element which is at least one of rare earth elements and alkaline earth elements. In the inorganic oxide, content of the aluminum oxide is 15 to 40% by mole relative to a total amount of aluminum in the aluminum oxide, a metal element in the metal oxide and the additional element. In the inorganic oxide, at least 80% of primary particles of the inorganic oxide have a particle diameter of 100 nm or less. In the inorganic oxide, at least a part of the primary particles have an enriched surface region where a content of the additional element is locally increased in a surface layer portion thereof. Document 1 also discloses a catalyst for purification of exhaust gas obtained by supporting rhodium on the inorganic oxide.

Moreover, Japanese Unexamined Patent Application Publication No. 2006-35019 (Document 2) discloses a particulate inorganic oxide comprising: an aluminum oxide, a metal oxide forming no composite oxide with the aluminum oxide; and an additional element which is at least one of rare earth elements and alkaline earth elements, the inorganic oxide having secondary particles formed through aggregation of primary particles. In the inorganic oxide, at least a part of the secondary particles contain multiple first primary particles and multiple second primary particles, the first primary particles containing the aluminum oxide and the additional element and having a particle diameter of 100 nm or less, the second primary particles containing the metal oxide and the additional element and having a particle diameter of 100 nm or less. In the inorganic oxide, at least a part of the first and second primary particles have an enriched surface region where a content of the additional element is locally increased in a surface layer portion thereof. Document 2 also discloses a catalyst for purification of exhaust gas obtained by supporting rhodium on the inorganic oxide.

Moreover, Japanese Unexamined Patent Application Publication No. 2006-55836 (Document 3) discloses a particulate inorganic oxide comprising: an aluminum oxide; a metal oxide forming no composite oxide with the aluminum oxide; and an additional element which is at least one of rare earth elements and alkaline earth elements. In the inorganic oxide, a content of the additional element is, in terms of amount of an oxide thereof, 1.5 to 5.6% by mole relative to a total amount of the additional element, aluminum in the aluminum oxide, and a metal element in the metal oxide. In the inorganic oxide, at least 80% of primary particles of the inorganic oxide have a particle diameter of 100 nm or less. In the inorganic oxide, at least a part of the primary particles have an enriched surface region where the content of the additional element is locally increased in a surface layer portion thereof. Document 3 also discloses a catalyst for purification of exhaust gas obtained by supporting rhodium on the inorganic oxide.

However, such catalysts for purification of exhaust gas as described in Documents 1 to 3 are not necessarily satisfactory in terms of well-balanced exhibition of an oxygen storage capability (OSC performance), a HC-reforming performance and a NOx purification performance.

DISCLOSURE OF THE INVENTION

The present invention has been accomplished in view of the problems of the conventional techniques. An object of the present invention is to provide an inorganic mixed oxide and a catalyst for purification of exhaust gas using the same, the inorganic mixed oxide having a sufficiently excellent heat resistance, and being capable of, when used as a support of a catalyst, causing the catalyst to exhibit a high level of oxygen storage capability, a high level of HC-reforming activity and a high level of NOx purification performance in a well-balanced manner.

The present inventors have earnestly studied in order to achieve the above object. As a result, the present inventors have revealed the following fact, which led to the completion of the present invention. Specifically, in a particulate inorganic mixed oxide comprising, in terms of element, aluminum, zirconium, cerium, and first and second additional elements each selected from the group consisting of rare earth elements other than cerium and alkaline earth elements, contents of the components are controlled within specific ranges, a region (an enriched surface region) where a concentration of the second additional element is locally high is formed in a surface layer portion of at least a part of particles of the inorganic mixed oxide, and an amount of the second additional element forming the enriched surface region is controlled within an appropriate range. Thereby, surprisingly, the inorganic mixed oxide comes to have a very excellent heat resistance, and is capable of, when the inorganic mixed oxide is used as a support of a catalyst, causing the catalyst to exhibit a high level of oxygen storage capability, a high level of HC-reforming activity and a high level of NOx purification performance in a well-balanced manner.

Specifically, the inorganic mixed oxide of the present invention is a particulate inorganic mixed oxide comprising aluminum, zirconium, cerium, and first and second additional elements each selected from the group consisting of rare earth elements other than cerium and alkaline earth elements. In the inorganic mixed oxide of the present invention, a content of aluminum in the inorganic mixed oxide is 60 to 90 at %, in terms of element content, relative to a total amount of elements which form cations in the inorganic mixed oxide. In the inorganic mixed oxide of the present invention, a content of cerium in the inorganic mixed oxide is 0.4 to 50 at %, in terms of element content, relative to a total amount of zirconium and cerium in the inorganic mixed oxide. In the inorganic mixed oxide of the present invention, a content of a total amount of the first and second additional elements is 1 to 12 at %, in terms of element content, relative to the total amount of the elements which form cations in the inorganic mixed oxide. In the inorganic mixed oxide of the present invention, at least 80% of primary particles of the inorganic mixed oxide have a particle diameter of 100 nm or less. In the inorganic mixed oxide of the present invention, at least a part of the primary particles have an enriched surface region where a content of the second additional element is locally increased in a surface layer portion thereof. In the inorganic mixed oxide of the present invention, an amount of the second additional element in the enriched surface region is 0.1 to 0.95% by mass, in terms of oxide, relative to a whole amount of the inorganic mixed oxide.

Each of the first and second additional elements according to the present invention is preferably an element selected from the group consisting of Y, La, Pr, Nd, Sm, Eu, Gd, Tb, Dy, Ho, Er, Tm, Yb, Lu, Mg, Ca, Sr, Ba, and Sc, and more preferably an element selected from the group consisting of Y, La, Pr, Nd, Yb, Mg, Ca, and Ba. The second additional element according to the present invention is preferably at least one element selected from the group consisting of La, Pr and Nd. Moreover, in the first and second additional elements according to the present invention, particularly preferable is that the first additional element is La and the second additional element is Nd.

In the inorganic mixed oxide of the present invention, a content of the first additional element in the inorganic mixed oxide is preferably 0.5 to 9 at % relative to the total amount of the elements which form cations in the inorganic mixed oxide. Moreover, in the inorganic mixed oxide of the present invention, a content of the total amount of zirconium and cerium is preferably 2.2 to 34.2 at %, in terms of element content, relative to the total amount of the elements which form cations in the inorganic mixed oxide.

A catalyst for purification of exhaust gas of the present invention is a catalyst in which rhodium is supported on above-described the inorganic mixed oxide of the present invention.

Furthermore, in the catalyst for purification of exhaust gas of the present invention, an amount of the rhodium supported is preferably 0.01 to 1% by mass relative to the total amount of the inorganic mixed oxide.

Note that it is not known exactly why the inorganic mixed oxide of the present invention achieves the above object; however, the present inventors speculate as follows. Specifically, zirconium and cerium in the inorganic mixed oxide of the present invention can be solid-solubilized in each other to form a composite oxide. Moreover, the formation of such a composite oxide makes it possible to cause the obtained inorganic mixed oxide to exhibit a high level of OSC performance. Meanwhile, an oxide of aluminum (an aluminum oxide) in the inorganic mixed oxide of the present invention does not form a composite oxide with any one of a zirconium oxide, a cerium oxide and/or the composite oxide thereof. For this reason, in the inorganic mixed oxide of the present invention, primary particles of the aluminum oxide are present differently from primary particles of the zirconium oxide, the cerium oxide and/or the composite oxide thereof. In the inorganic mixed oxide of the present invention, these primary particle species aggregate together, while intervening in each other, to form secondary particles. When such secondary particles are formed, the primary particles of the aluminum oxide serve as diffusion barrier in fusion of the primary particles of the zirconium oxide, the cerium oxide and/or the composite oxide thereof with one another, whereby sintering of the primary particles of the zirconium oxide, the cerium oxide and/or the composite oxide thereof is inhibited. In the inorganic mixed oxide of the present invention, each of the components forming the primary particles was contained at a ratio in the above-described specific range, whereby the amount of the aluminum oxide, which serves as the diffusion barrier, is controlled in an appropriate amount.

Moreover, in the inorganic mixed oxide of the present invention, the first and second additional elements are contained in addition to the above-described components. Here, the first additional element is an element (a structure-stabilizing element) which functions mainly to stabilize the structure of the primary particles of the aluminum oxide and/or the structure of at least one kind of the primary particles of the zirconium oxide, the cerium oxide and the composite oxide thereof. Meanwhile, the second additional element is an element contained in order to arrange them so that the content thereof is locally increased in at least a part of the surface layer portion of the primary particles forming the inorganic mixed oxide. The second additional element is an element (a surface-enrichment element) mainly forming the enriched surface region. In addition, such a second additional element (the surface-enrichment element) mainly functions to stabilize rhodium in an oxidizing atmosphere, when, for example, rhodium is supported on the inorganic mixed oxide as a catalyst component. In the present invention, such a first additional element (the structure-stabilizing element) and such a second additional element (the surface-enrichment element) are each contained at a ratio in the specific range described above, whereby a sufficient phase stability and a sufficient crystal stability of each of the primary particles are obtained. As a result, the phase stability and the crystal stability of each of the primary particles, themselves, under a high temperature environment are sufficiently improved. The present inventors speculate that, for this reason, when the inorganic mixed oxide of the present invention is used as a support, and when rhodium, preferable as a catalyst component, is supported thereon, it is possible to cause the obtained catalyst to exhibit a sufficiently high level of heat resistance, and to cause the obtained catalyst to exhibit a high level of OSC performance, a high level of HC-reforming activity and a high level of NOx purification performance in a well-balanced manner, because of sufficient prevention of deterioration of rhodium under conditions of high temperature.

When rhodium (Rh), preferable as a catalyst component, is supported on the inorganic mixed oxide of the present invention, the second additional element, which is basic when converted to an oxide, and the rhodium form bonding represented by Rh—O-M (M is the second additional element in the support) on the surface of the inorganic mixed oxide under an oxidizing atmosphere. Thereby, particles of rhodium supported on the surface of the inorganic mixed oxide become hard to migrate. As a result, the grain growth of rhodium is effectively inhibited, and migration of the particles of rhodium to a different support is sufficiently inhibited. Preferable as the first additional element (the structure-stabilizing element) is any one of an element which is solid-solubilized in an oxide of aluminum and an element which is solid-solubilized in an oxide of zirconium, an oxide of cerium and/or a composite oxide of zirconium and cerium. Preferable as the second additional element (the surface-enrichment element) is an element which forms the bonding represented by Rh—O-M (M is the second additional element in the support) in an oxidizing atmosphere and which also can be converted into metal in a reducing atmosphere rapidly. In the present invention, considering the relationship of the kind of the first additional element present inside the primary particles and the range of content thereof with the kind of the second additional element present in the enriched surface region of the primary particles and the range of content thereof, the whole amount of additional elements including both the first additional element and the second additional element is limited to the above-described specific range, and the content of the second additional element in the enriched surface region is limited to the above-described specific range. Thereby, the grain growth of the support itself and the grain growth of the catalyst component are inhibited in a well-balanced manner. The present inventors speculate that, accordingly, when the inorganic mixed oxide of the present invention is used as a support of a catalyst, a high level of OSC performance, a high level of HC-reforming activity and a high level of NOx purification performance can be exhibited in a well-balanced manner.

According to the present invention, it is possible to provide an inorganic mixed oxide and a catalyst for purification of exhaust gas using the same, the inorganic mixed oxide having a sufficiently excellent heat resistance, and being capable of, when used as a support of a catalyst, causing the catalyst to exhibit a high level of oxygen storage capability, a high level of HC-reforming activity and a high level of NOx purification performance in a well-balanced manner.

DETAILED DESCRIPTION OF THE PREFERRED EMBODIMENTS

Figure 1:
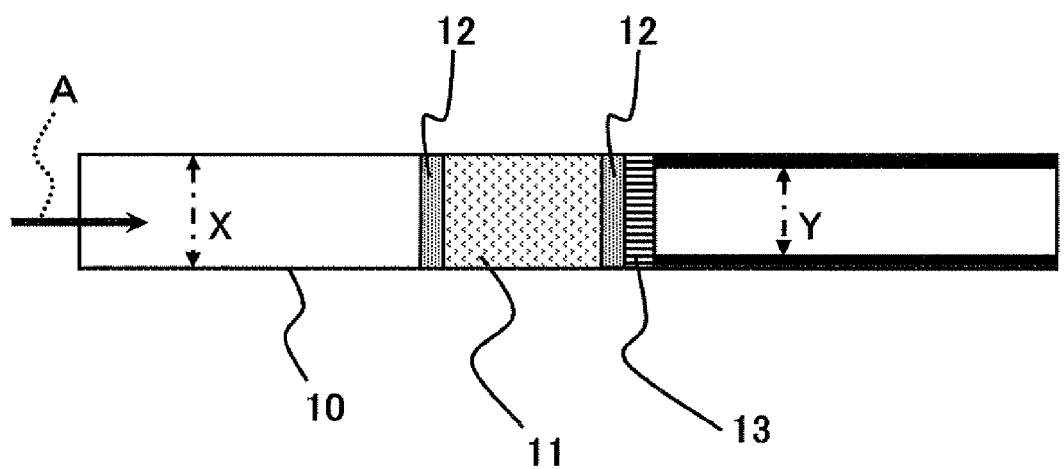
FIG. 1 is a schematic diagram of a durability test apparatus used in a heat-resistance test of catalysts.

Hereinafter, the present invention will be described in detail on the basis of preferred embodiments thereof.

<Inorganic Mixed Oxide>

First, an inorganic mixed oxide of the present invention will be described. Specifically, the inorganic mixed oxide of the present invention is a particulate inorganic mixed oxide comprising:

aluminum;
zirconium;
cerium; and
first and second additional elements each selected from the group consisting of rare earth elements other than cerium and alkaline earth elements, wherein a content of aluminum in the inorganic mixed oxide is 60 to 90 at %, in terms of element content, relative to a total amount of elements which form cations in the inorganic mixed oxide, a content of cerium in the inorganic mixed oxide is 0.4 to 50 at %, in terms of element content, relative to a total amount of zirconium and cerium in the inorganic mixed oxide, a content of a total amount of the first and second additional elements is 1 to 12 at %, in terms of element content, relative to the total amount of the elements which form cations in the inorganic mixed oxide, at least 80% of primary particles of the inorganic mixed oxide have a particle diameter of 100 nm or less, at least a part of the primary particles have an enriched surface region where a content of the second additional element is locally increased in a surface layer portion thereof, and an amount of the second additional element in the enriched surface region is 0.1 to 0.95% by mass, in terms of oxide, relative to a whole amount of the inorganic mixed oxide.

Aluminum, zirconium, cerium, and the first and second additional elements according to the present invention each form any one of an oxide and a composite oxide in the inorganic mixed oxide. For example, the aluminum forms an aluminum oxide ($Al_2O_3$) in the inorganic mixed oxide. Such an aluminum oxide is not particularly limited, and may be amorphous (for example, activated alumina) or crystalline.

The content of such aluminum is 60 to 90 at %, in terms of element content, relative to the total amount of all elements which form cations in the inorganic mixed oxide. If the content of such aluminum is less than 60 at %, the heat resistance of the obtained inorganic mixed oxide is lowered. Meanwhile, if the content exceeds 90 at %, it is difficult that sufficient exhibition of an OSC performance, an HC-reforming performance and a NOx purification performance are exhibited in a well-balanced manner. A range of the content of such aluminum is preferably a range from 65 to 85 at % relative to the total amount of all elements which form cations in the inorganic mixed oxide, from the viewpoint of improvement in heat resistance of the obtained inorganic mixed oxide, and the viewpoint of a catalytic performance in a case where the inorganic mixed oxide is used as a support of a catalyst.

Preferably, zirconium and cerium in the inorganic mixed oxide of the present invention form a composite oxide in which the zirconium and the cerium are solid-solubilized homogeneously in each other. The formation of such a composite oxide results in tendencies that the obtained inorganic mixed oxide can exhibit a sufficient OSC performance and that the heat resistance becomes high. In the inorganic mixed oxide of the present invention, primary particles of the aluminum oxide and primary particles of a zirconium oxide, a cerium oxide and/or a composite oxide thereof substantially form different primary particle species, which aggregate together, while existing among each other, to form secondary particles. Hence, the different primary particle species serve as diffusion barrier to one another, whereby grain growth of each primary particle species is inhibited and the heat resistance is improved. Note that the fact that the primary particles of the aluminum oxide are formed differently from the primary particles of the zirconium oxide, the cerium oxide and/or the composite oxide thereof as described above can be checked by an analytic method to be described later, or the like.

In the present invention, a ratio of the total amount of zirconium and cerium is preferably in a range from 0.7 to 39.2 at %, and more preferably in a range from 2.2 to 34.2 at %, in terms of element content, relative to the total amount of all elements which form cations in the inorganic mixed oxide. If such a ratio of the total amount of zirconium and cerium is less than the above-described lower limit, activity for a steam reforming reaction of a catalyst produced by supporting rhodium tends to be low. Meanwhile, if such a ratio exceeds the above-described upper limit, the amount of aluminum, which acts as barrier to diffusion, becomes insufficient, and the heat resistance of the support itself is lowered, thereby resulting in a tendency that grain growth of rhodium cannot be inhibited sufficiently.

In the present invention, the content of cerium in the inorganic mixed oxide is 0.4 to 50 at %, in terms of element content, relative to the total amount of zirconium and cerium in the inorganic mixed oxide. If such a content of cerium relative to the total amount of zirconium and cerium in the inorganic mixed oxide is less than 0.4 at %, the OSC performance of the obtained inorganic mixed oxide is lowered, whereby an amount of oxygen obtained becomes insufficient. Meanwhile, if such a content of cerium exceeds 50 at %, the efficiency of the OSC performance is lowered, whereby the theoretical amount of oxygen cannot be obtained. Moreover, a sufficient NOx purification performance and a sufficient HC-reforming activity cannot be exhibited. Such a content of cerium is more preferably 10 to 45 at %, in terms of element content, relative to the total amount of zirconium and cerium in the inorganic mixed oxide, from the viewpoint that an OSC performance, an HC-reforming performance, and a NOx purification performance are sufficiently exhibited in a well-balanced manner.

The first additional element according to the present invention is an element selected from the group consisting of rare earth elements other than cerium and alkaline earth elements. Such a first additional element is an element (structure-stabilizing element) which is contained and arranged in the primary particles of the inorganic mixed oxide with a homogeneous dispersion, mainly for the achievement of stabilization of a structure of the inorganic mixed oxide. As such a first additional element, suitably used is yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), magnesium (Mg), calcium (Ca), strontium (Sr), barium (Ba) or scandium (Sc), for example. Among these elements, Y, La, Pr, Nd, Yb, Mg, Ca, and Ba are more preferable, Y, La, Pr and Nd are further preferable, and La is particularly preferable, from the viewpoint of further improvement in heat resistance of the obtained inorganic mixed oxide as a support. Note that, as the first additional element, one kind of the above-described elements can be used alone or a combination of two or more kinds of the above-described elements can be used.

In the inorganic mixed oxide of the present invention, the first additional element is present in a solid-solubilized or dispersed state in the primary particles of the aluminum oxide and/or the primary particles of at least one of the zirconium oxide, the cerium oxide and the composite oxide thereof, or other states. Specifically, such a first additional element may be present in a solid-solubilized or dispersed state only in the aluminum oxide, or may be present in a solid-solubilized or dispersed state in the aluminum oxide and the composite oxide, for example. Particularly, also in an inner layer portion (a portion other than the enriched surface region to be described later) of the primary particle of the inorganic mixed oxide, at least a part of the first additional element (the structure-stabilizing element) of the additional elements is preferably solid-solubilized in components such as the aluminum oxide and the zirconium oxide, from the viewpoint of causing such a first additional element to more markedly exhibit the effect of stabilizing the structure.

The second additional element according to the present invention is an element selected from the group consisting of rare earth elements other than cerium and alkaline earth elements. Such a second additional element is an element (a surface-enrichment element) which is mainly contained and arranged so that the element forms the enriched surface region to be described later, for the achievement of formation of bonding represented by Rh—O-M (in the formula, M represents the second additional element) on a surface of the inorganic mixed oxide. As such a second additional element, suitably used is yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), magnesium (Mg), calcium (Ca), strontium (Sr), barium (Ba) or scandium (Sc), for example. Among these elements, Y, La, Pr, Nd, Yb, Mg, Ca, and Ba are more preferable, La, Pr and Nd are further preferable, and Nd is particularly preferable, from the viewpoint that stabilization of rhodium (Rh) is achieved through the formation of the bonding represented by Rh—O-M (in the formula, M represents the second additional element) on the surface of the inorganic mixed oxide, when the obtained inorganic mixed oxide is used as a Rh catalyst. Note that, as the second additional element, one kind of the above-described elements can be used alone or a combination of two or more kinds of the above-described elements can be used.

A combination of such a first additional element (the structure-stabilizing element) and such a second additional element (the surface-enrichment element) is not particularly limited, and the same element may be used as each of the first additional element and the second additional element. Note that a preferred example of an inorganic mixed oxide of the present invention in which such a first additional element and such a second additional element are more clearly distinguished is an inorganic mixed oxide which uses, for example, La as the first additional element (the structure-stabilizing element) and Nd as the second additional element (the surface-enrichment element). Specifically, a preferred example of such an inorganic mixed oxide of the present invention is an inorganic mixed oxide comprising aluminum, zirconium, cerium, Nd as the surface-enrichment element, and La as the structure-stabilizing element.

The content of the total amount of such first and second additional elements is 1 to 12 at %, in terms of element content, relative to the total amount of elements which form cations in the inorganic mixed oxide. If such a content of the total amount of the first and second additional elements is less than 1 at %, the heat resistance of the obtained inorganic mixed oxide becomes insufficient. Meanwhile, if such a content exceeds 12 at %, well-balanced exhibition of a sufficient OSC performance, a sufficient NOx purification performance and a sufficient HC-reforming activity becomes impossible in a case where a catalyst supporting rhodium is produced.

Moreover, a content of such a first additional element is preferably 0.5 to 9 at %, and more preferably 0.8 to 6 at %, in terms of element content, relative to the total amount of all elements which form cations in the inorganic mixed oxide. If such a content of the first additional element (the structure-stabilizing element) is less than the lower limit, there is tendency that the heat resistance of the obtained inorganic mixed oxide cannot be kept sufficiently. Meanwhile, if such a content exceeds the upper limit, the HC-reforming performance and the NOx purification performance tend to be lowered.

A content by mass, in terms of oxide, of such a second additional element is preferably 0.5 to 6% by mass, and more preferably 1 to 6% by mass, relative to the inorganic mixed oxide. If such a content of the second additional element is lower than the lower limit, the effect of forming the bonding represented by Rh—O-M (where M is the second additional element) on a surface of the obtained inorganic mixed oxide is not obtained sufficiently. Meanwhile, if such a content of the second additional element exceeds the upper limit, the content of the second additional element tends to be excessive relative to that of the rhodium to be supported.

In terms of ratio of the number of particles, at least 80% of the primary particles of the inorganic mixed oxide of the present invention need to have a particle diameter of 100 nm or less, for the purpose of enhancing the catalytic activity by enlarging the specific surface area. The ratio of primary particles having a particle diameter of 100 nm or less is more preferably 90% or more, and is further preferably 95% or more. Note that the particle diameter represents the largest one of diameters which is definable for one particle. An average particle diameter of primary particles all over the particulate inorganic mixed oxide is preferably 1 to 50 nm, and more preferably 3 to 40 nm.

Moreover, at least apart of the secondary particles formed through aggregation of such primary particles of the inorganic mixed oxide are preferably formed through aggregation of primary particles mainly made of an aluminum oxide and having a particle diameter of 100 nm or less, and primary particles mainly made of a zirconium oxide, a cerium oxide and/or a composite oxide thereof and having a particle diameter of 100 nm or less. Thereby, sintering of the support under high temperature environments tends to be further markedly suppressed.

Here, the "primary particle mainly made of an aluminum oxide" mean primary particle formed of an aluminum oxide as a main component. Specifically, as the particle mainly made of an aluminum oxide, it is preferable that at least half of whole of the particle comprises an aluminum oxide, in terms of molar ratio or mass ratio. Similar expressions such as the "primary particles mainly made of a zirconium oxide, a cerium oxide and/or a composite oxide thereof" have similar meanings as described above.

Note that the particle diameter of the primary particles, the compositions thereof, and aggregation state of the secondary particles can be verified through observation or analysis of the inorganic mixed oxide by employing an appropriate combination of a TEM (transmission electron microscope), an SEM (scanning electron microscope), an FE-STEM (field emission-scanning transmission electron microscope), an EDX (energy dispersive X-ray spectrometer), an XPS (X-ray photoelectron spectrometer), and the like.

In the present invention, at least a part of the primary particles forming the inorganic mixed oxide need to have the enriched surface region where the content of the second additional element is locally increased in the surface layer portion thereof.

In the present invention, the content of the second additional element in the enriched surface region only needs to be relatively higher than a content of the second additional element in a region on the inner layer side in the particle. Such an enriched surface region is formed so as to have a certain depth and cover a surface of the primary particle, but it is not necessary to completely coverall the surface of the primary particle. Ordinarily, the content of the second additional element in the primary particle is gradually increased from the inner layer side to the surface layer side. Accordingly, the enriched surface region and the central portion, of the particles, on a deeper layer side of the enriched surface region do not necessarily form a clear boundary therebetween.

In such an enriched surface region, the second additional element is present in the surface layer portion of the primary particles of the inorganic mixed oxide. In the present invention, the content of the second additional element in the enriched surface region is 0.1 to 0.95% by mass, and more preferably 0.15 to 0.9% by mass, in terms of oxide, relative to the whole amount of the inorganic mixed oxide. If the content of the second additional element in the enriched surface region is less than 0.1% by mass, interaction between the second additional element and a catalytic metal such as rhodium becomes insufficient, whereby a catalyst having an excellent heat resistance cannot be obtained. Meanwhile, if the amount exceeds 0.95% by mass, the interaction with the catalytic metal is too strong, whereby a catalytic activity is lowered when the obtained inorganic mixed oxide is used as a support.

Note that, the second additional element in the enriched surface region dissolves out upon contact with an acidic solution such as an aqueous solution of nitric acid. Accordingly, the content of the second additional element present in the enriched surface region can be verified through determination of the content of the second additional element which is dissolved into an aqueous solution of nitric acid, when the inorganic mixed oxide is brought into contact with the aqueous solution of nitric acid. More specifically, for example, 0.1 g of the inorganic mixed oxide is added into 10 ml of a 0.1 N aqueous solution of nitric acid, followed by stirring for 2 hours. Thereby, the second additional element present in the enriched surface region is dissolved out, and the content of the second additional element dissolved out is determined by chemical analysis. Thus, the content of the second additional element in the enriched surface region can be verified.

Besides the method through the dissolution of the second additional element as described above, the formation of the enriched surface region in the primary particles of the inorganic mixed oxide can be detected, for example, as follows. Specifically, an average value of the content of the second additional element of the entire inorganic mixed oxide is determined by performing composition analysis on the entire inorganic mixed oxide by use of an ICP (inductively coupled plasma atomic emission spectrometer) or the like. Alternatively, the content of the second additional element is calculated from the composition ratio of metals in the inorganic mixed oxide. Then, a content of the second additional element in the surface layer portion may be checked by XPS analysis to be higher than the content as determined above.

Next, an example of a method for producing an inorganic mixed oxide of the present invention will be described. For example, a production method which can be employed includes: a coprecipitation step of obtaining a coprecipitate containing aluminum, zirconium, cerium, and a first additional element selected from the group consisting of rare earth elements other than cerium and alkaline earth elements; a first calcination step of obtaining a mixture of oxides by calcining the obtained coprecipitate; and a second calcination step of attaching a second additional element selected from the group consisting of rare earth elements other than cerium and alkaline earth elements to the obtained mixture, followed by further calcination.

The coprecipitate is prepared from a solution in which aluminum, zirconium, cerium and the first additional element are dissolved. A solution which is preferably used to obtain such a coprecipitate is one obtained by dissolving salts of aluminum, zirconium, cerium and the first additional element, or the like in water, alcohol, or the like. Examples of such salts include sulfates, nitrates, chlorides, acetates, and the like. Moreover, when a trivalent salt is used as a raw material salt of cerium, it is preferable to add hydrogen peroxide to oxidize the trivalent salt into a tetravalent one. By converting the cerium into tetravalent as described above, the degrees of solid-solubilization of cerium and zirconium tend to be increased.

The pH of the solution for obtaining the coprecipitate thereof is adjusted in a range (preferably, to a pH of 9 or more) within which hydroxides of the metal elements precipitate, by, for example, mixing the solution with an alkaline solution. Thereby, the coprecipitate as a precursor of the mixture of oxides can be prepared. As the alkaline solution, a solution of any one of ammonia and ammonium carbonate is preferably used, because of easiness in removal thereof by vaporization at the time of calcination or the like.

In the first calcination step, the obtained coprecipitate is preferably centrifuged and washed, and then calcined by heating. Thus, the mixture of oxides is obtained. In such a first calcination step, the calcination is preferably performed under an oxidizing atmosphere, such as an air atmosphere, at 600 to 1200° C. for 0.5 to 10 hours.

In the second calcination step, the second additional element is further attached to the mixture of oxides, and the mixture of oxides is calcined. Thereby, the particulate inorganic mixed oxide can be obtained. With such a method, most of the attached second additional element is calcined to form an oxide, and comes to be present in the surface layer portion of the primary particles. For this reason, such a method makes it possible to obtain the inorganic mixed oxide having a surface region enriched with the second additional element.

The following is an example of such attachment of the second additional element. Specifically, the mixture of oxides is suspended in a solution in which a salt (a nitrate or the like) of the second additional element is dissolved. Thus, the second additional element is supported. The content of the second additional element attached to the mixture of oxides (the second additional element used for the formation of the enriched surface region) is preferably 0.5 to 6% by mass (more preferably, 1 to 6% by mass), in terms of oxide of the additional element, relative to the whole amount of the inorganic mixed oxide, from the viewpoint of adjustment of the amount of the additional element in the enriched surface region of the obtained inorganic mixed oxide. By setting such a content of the second additional element attached to the mixture of oxides in the above-described range, the content of the second additional element in the enriched surface region of the obtained inorganic mixed oxide can be set to 0.1 to 0.95% by mass, in terms of oxide, relative to the whole amount of the inorganic mixed oxide. Note that the kind of the first additional element contained in the solution for obtaining the coprecipitate and the kind of the second additional element attached to the mixture of oxides may be the same or different, and may be selected from the additional elements described above as appropriate in accordance with the desired design. For example, when an inorganic mixed oxide comprising aluminum, zirconium, cerium, La as the first additional element (the structure-stabilizing element) and Nd as the second additional element (the surface-enrichment element) is produced, the inorganic mixed oxide being a preferred example of the inorganic mixed oxide of the present invention, La may be selected as the first additional element contained in the solution for obtaining the coprecipitate, and Nd may be selected as the second additional element attached to the mixture of oxides.

Moreover, in such a second calcination step, a calcination temperature is preferably in a range from 400 to 1100° C., and more preferably in a range from 700 to 1000° C. A calcination temperature which is below the lower limit leads to a tendency that it becomes difficult to control the enriched surface region of the obtained inorganic mixed oxide in an appropriate range, whereby the interaction between a catalytic metal and the additional element cannot be controlled appropriately. Meanwhile, a calcination temperature exceeding the upper limit leads to a tendency that reaction of the additional element with the mixture of oxides proceeds, whereby it becomes difficult to keep the enriched surface region. The calcination time is preferably in a range from 0.5 to 10 hours.

<Catalyst for Purification of Exhaust Gas>

A catalyst for purification of exhaust gas of the present invention is a catalyst in which rhodium is supported on the above-described inorganic mixed oxide of the present invention. In the catalyst for purification of exhaust gas of the present invention, the inorganic mixed oxide of the present invention in which the amount of the additional element in the enriched surface region is appropriately adjusted is used as a support. Accordingly, the solid basicity of the support is appropriately controlled. It is speculated that such appropriate control of the solid basicity of the support inhibits the migration of supported rhodium even under a high temperature environment, thereby inhibiting the grain growth thereof. Moreover, when such a catalyst for purification of exhaust gas is used in actual vehicles, it is preferable to use the catalyst for purification of exhaust gas of the present invention in combination with a different catalyst in which a catalytic metal other than rhodium, such as platinum and palladium, is supported. In such a case, the migration of rhodium from the catalyst for purification of exhaust gas of the present invention to a support of the combined different catalyst is sufficiently inhibited, whereby the rhodium can be kept being used on an optimum support. In the catalyst for purification of exhaust gas of the present invention, the use of the inorganic mixed oxide of the present invention sufficiently reduces deterioration of rhodium due to the grain growth of rhodium or the migration of rhodium to the different support. Thereby, under an atmosphere containing an excess reducing agent, where the characteristics of Rh are especially important, the NOx purification performance is sufficiently exhibited. Moreover, it is speculated that the selection of an appropriate second additional element allows the formation of the bonding represented by Rh—O-M (in the formula, M represents the second additional element), thereby achieving both the inhibition of grain growth of rhodium and easiness of reduction to rhodium metal. Consequently, it is speculated that performance at a low temperature (catalytic activity in a low temperature range) is improved. Note that rhodium can be supported on the inorganic mixed oxide, by employing a conventionally known method such as the impregnation method. A catalytic metal other than rhodium, such as platinum and palladium, may be supported further on the inorganic mixed oxide of the present invention.

At least a part of rhodium in the catalyst for purification of exhaust gas of the present invention is preferably supported in the surface layer portion of the primary particles of the inorganic mixed oxide in such a manner as to be in contact with a region (the enriched surface region) where the content of the additional element is locally increased. Thereby, the second additional element more markedly exhibits the effect of inhibiting the grain growth of rhodium.

An amount of the rhodium supported in the catalyst for purification of exhaust gas of the present invention is preferably 0.01 to 1% by mass relative to the total amount of the inorganic mixed oxide, for the purpose of exhibition of a sufficiently high catalytic activity in terms of catalytic activity per amount of rhodium supported. The amount of rhodium supported in the catalyst for purification of exhaust gas of the present invention is more preferably 0.01 to 0.5% by mass, and further preferably 0.01 to 0.3% by mass, relative to the total amount of the inorganic mixed oxide, for the effect of the inhibition of the grain growth of rhodium achieved by the second additional element.

The configuration of use of such a catalyst for purification of exhaust gas is not particularly limited. For example, such a catalyst for purification of exhaust gas can be used in such a manner that a layer made of the catalyst for purification of exhaust gas is formed on a surface of a substrate such as a honeycomb-shaped monolithic substrate, a pellet substrate, or a foam substrate, and the catalyst for purification of exhaust gas is placed in a flow path of exhaust gas in an internal-combustion engine or the like.

EXAMPLES

Hereinafter, the present invention will be described more specifically on the basis of Examples and Comparative Examples, but the present invention is not limited the following Examples.

Examples 1 to 7 and Comparative Examples 1 and 2

Each inorganic mixed oxide was produced such that each component had a content shown in Table 1. Specifically, first, aluminum nitrate nonahydrate was dissolved in ion exchanged water. Then, zirconium oxynitrate dihydrate, cerium nitrate hexahydrate and lanthanum nitrate hexahydrate were mixed with the obtained aqueous solution of aluminum nitrate such that the numbers of moles shown in Table 1 were achieved. Further, hydrogen peroxide was added thereto in a 1.2-fold molar amount relative to cerium in the cerium nitrate, followed by stirring. Thus, a solution of raw materials was obtained. Next, the solution of raw materials was added, with sufficient stirring, to ammonia water containing ammonia in an amount of 1.2 times the neutralization equivalent relative to the metal cations in the solution. Thus, the pH of the solution was made 9 or higher, thereby coprecipitating hydroxides of aluminum, zirconium, cerium and lanthanum. Thus, a precursor of oxides was obtained. Then, the obtained precursor of oxides was centrifuged, washed thoroughly, then dried in air at 150° C. for 7 hours, and subjected to preliminary calcination by further heating at 330° C. for 5 hours. Subsequently, a solid material after the preliminary calcination was dry crushed by use of a crusher (manufactured by OSAKA CHEMICAL Co., Ltd. under the product name of "small crusher Wonder Blender") to 75 μm or less. Subsequently, calcination (first calcination) was performed by heating in air at 700° C. for 5 hours, and then further heating at 900° C. for 5 hours. Thereby, a mixture of oxides after the first calcination containing as elements aluminum (Al), zirconium (Zr), cerium (Ce) and lanthanum (La: the first additional element) was obtained.

Next, the obtained mixture of oxides was suspended in an aqueous solution containing a nitrate of the second additional element (Nd, La or Pr) [an aqueous solution of neodymium nitrate (Examples 1 and 4 to 7 and Comparative Example 2), an aqueous solution of lanthanum nitrate (Example 2) or an aqueous solution of praseodymium nitrate (Example 3), each prepared such that the content of the second additional element, in terms of oxide, relative to the whole amount of the inorganic mixed oxide to be obtained was the ratio shown in Table 1]. The obtained suspension was stirred for 3 hours. Then, the suspension was heated with stirring, whereby water was evaporated. The residual solid material was subjected to calcination (second calcination) by heating in air at 110° C. for 40 hours, and then further heating in air at 900° C. for 5 hours. Thus, the particulate inorganic mixed oxide was obtained. Note that observation of the obtained inorganic mixed oxides with a TEM showed that at least 80% of the primary particles of each of the inorganic mixed oxides had a particle diameter of 100 nm or less.

In addition, Table 1 shows the content, calculated from the fed amounts, of each component in the inorganic mixed oxides. Table 1 also shows the content (at %), calculated from the fed amounts, of the total amount of the additional elements [the total amount of the first additional element (La) and the second additional element (Nd (Examples 1 and 4 to 7 and Comparative Example 2), La (Example 2) or Pr (Example 3))] relative to the total amount of all elements which form cations in each of the inorganic mixed oxides.

Subsequently, each catalyst for purification of exhaust gas in which rhodium was supported on a support was obtained as follows. Specifically, each of the obtained inorganic mixed oxides was added as the support in an aqueous solution of $Rh(NO_3)_3$, and the mixture was stirred. Then, water was evaporated, and the residual solid material was dried under a temperature condition of 110° C. Then, the dried solid material was subjected to calcination by heating in air at 500° C. for 3 hours. Note that the concentration of the aqueous solution of $Rh(NO_3)_3$ was adjusted such that the amount of rhodium supported in each of the obtained catalysts for purification of exhaust gas was 0.25% by mass relative to the support.

Next, to each of the obtained catalysts for purification of exhaust gas, a support for Pt which had been heated in air at 1000° C. for 5 hours was added at such a ratio that the mass of the support for Pt was ⅓ of the mass of the catalyst for purification of exhaust gas, followed by dry-mixing in a mortar. Thus, a mixture was obtained. Thereafter, the obtained mixture was vacuum-packed, and formed into a pellet shape having a diameter of 0.5 to 1 mm by use of a cold isostatic pressing apparatus at a pressure of 1000 Kgf/cm$^2$. Thus, each mixed pellet catalyst was formed. Note that, as the support for Pt, a support whose composition was cerium oxide-zirconium oxide-lanthanum oxide-praseodymium oxide was used. In each of the following tests, the mixed pellet catalysts each formed of such a support for Pt and the catalyst for purification of exhaust gas were used. Thereby, it was made possible to evaluate the catalysts for purification of exhaust gas in each of which Rh was supported on the inorganic mixed oxide of the present invention in such a manner that deactivation due to the migration of Rh to another support, which is a cause of deterioration of Rh, was taken into consideration.

[Evaluation of Characteristics of Inorganic Mixed Oxides and Catalysts Obtained in Examples 1 to 7 and Comparative Examples 1 and 2]

<Heat-Resistance Test of Catalysts>

A durability test was performed on the mixed pellet catalysts obtained in Examples 1 to 7 and Comparative Examples 1 and 2. Specifically, first, each of the mixed pellet catalysts was placed in a silica glass tube, and a durability test apparatus as shown in FIG. 1 was formed. Note that an inner diameter X of the silica glass tube 10 on an entering gas side was 10 mm. Into the silica glass tube 10, another silica glass tube having an inner diameter Y of 7 mm was inserted on an exiting gas side, and a honeycomb substrate made of cordierite was placed. When each of the mixed pellet catalysts 11 (3 g) was placed therein, silica glass wool 12 was provided in front of and behind the catalyst 11. Note that the arrow A in FIG. 1 shows the flow of gas. Next, to each of the mixed pellet catalysts, supply of a rich gas containing $H_2$ (2% by volume), $CO_2$ (10% by volume), $H_2O$ (3% by volume) and $N_2$ (the balance) for 5 minutes and supply of a lean gas containing $O_2$ (1% by volume), $CO_2$ (10% by volume), $H_2O$ (3% by volume) and $N_2$ (the balance) for 5 minutes were alternately performed for 50 hours. Note that such a rich gas and a lean gas were supplied so as to pass at 500 ml/min per 3 g of the catalyst under a condition of a temperature of 1000° C.

<Measurement of NOx Purification Ratios of Catalysts>

Figure 2:
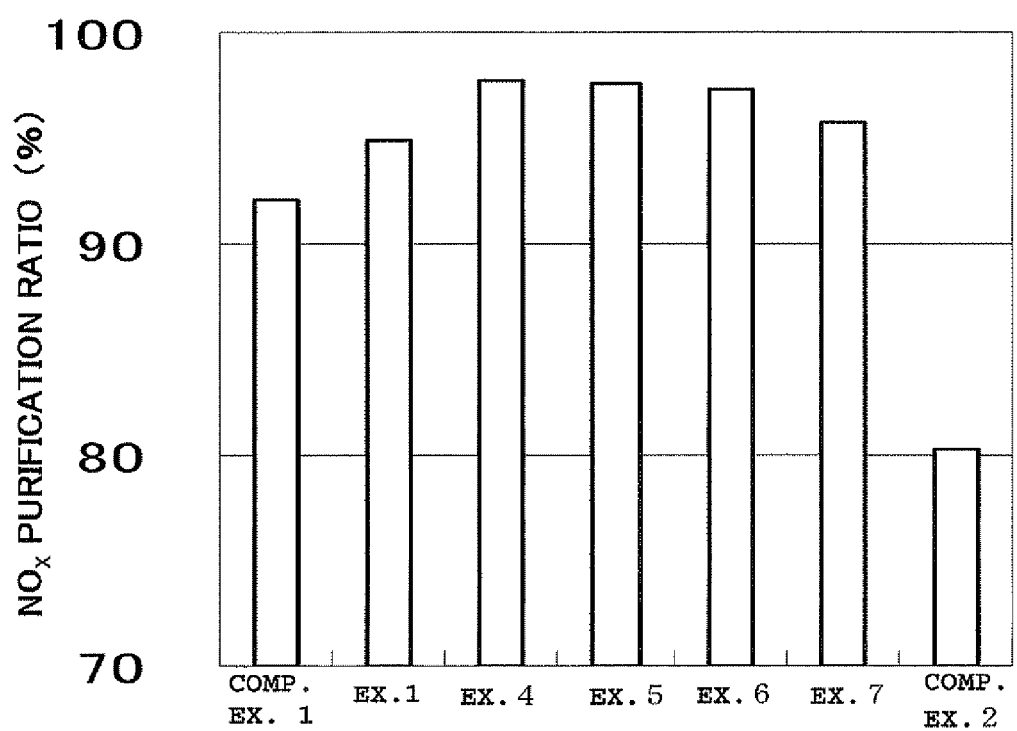
FIG. 2 is a graph showing NOx purification ratios of mixed pellet catalysts (Example 1, Examples 4 to 7, and Comparative Examples 1 and 2) after a durability test.

By use of each of the mixed pellet catalysts (Examples 1 to 7 and Comparative Examples 1 and 2) after the durability test, a NOx purification ratio was measured. In such a measurement of the NOx purification ratio, first, each catalyst sample obtained by mixing 0.5 g of the corresponding one of the mixed pellet catalysts after the durability test with 0.5 g of silica glass sand was set in a pellet-catalyst evaluation apparatus (manufactured by Best Instruments Co., Ltd. under the product name of "CATA-5000-4"). Next, as supplied gases, a lean gas containing NO (0.15% by volume), CO (0.65% by volume), $C_3H_6$ (0% by volume, in term of C), $O_2$ (0.8% by volume), $CO_2$ (10% by volume), $H_2O$ (4% by volume) and $N_2$ (the balance) and a rich gas containing NO (0.15% by volume), CO (0.65% by volume), $C_3H_6$ (0.3% by volume, in term of C), $O_2$ (0% by volume), $CO_2$ (10% by volume), $H_2O$ (4% by volume) and $N_2$ (the balance) were used, and the gas flow rate was 7 L/minute. Then, the lean gas and the rich gas were switched from one to the other every 10 minutes, a pre-treatment was performed under such a condition that the temperature of gas entering the catalyst was 600° C. Thereafter, while the temperature of the entering gas was kept at 450° C., the gas was switched to the rich gas. Then, when a steady state was achieved, the concentrations of $NO_x$ in the gas entering the catalyst and in the gas exiting from the catalyst were measured, and the NOx purification ratio was calculated from these measured values. Table 1 shows the obtained results. In addition, FIG. 2 shows a graph of the NOx purification ratios of the mixed pellet catalysts obtained in Example 1, Examples 4 to 7, and Comparative Examples 1 and 2.

<Measurement of HC-Reforming Ratios of Catalysts>

Figure 3:
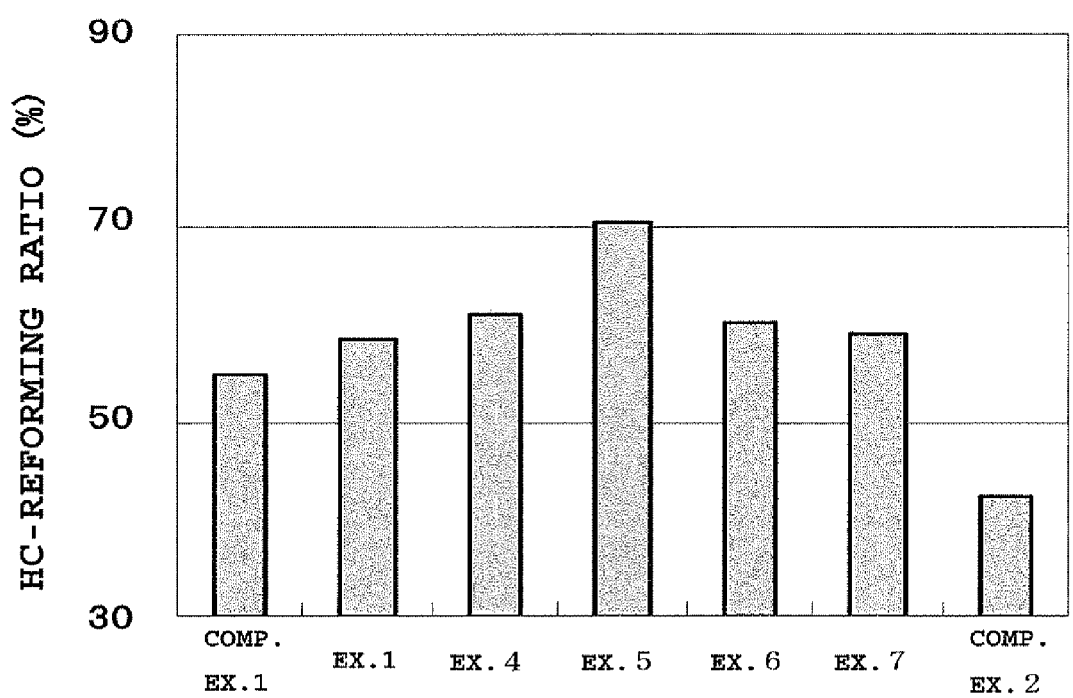
FIG. 3 is a graph showing HC-reforming ratios of the mixed pellet catalysts (Example 1, Examples 4 to 7, and Comparative Examples 1 and 2) after the durability test.

By use of each of the mixed pellet catalysts (Examples 1 to 7 and Comparative Examples 1 and 2) after the durability test, a HC-reforming ratio was measured. In such a measurement of the HC-reforming activity, the concentrations of the hydrocarbon in the gas entering the catalyst and in the gas exiting from the catalyst in a steady state were measured by employing the same method as in the measurement of the NOx purification performances as described above, and the HC-reforming ratio was calculated from these measured values. Table 1 shows the obtained results. In addition, FIG. 3 shows a graph of the HC-reforming ratios of the mixed pellet catalysts obtained in Example 1, Examples 4 to 7, and Comparative Examples 1 and 2.

<Measurement of Amounts of OSC>

Figure 4:
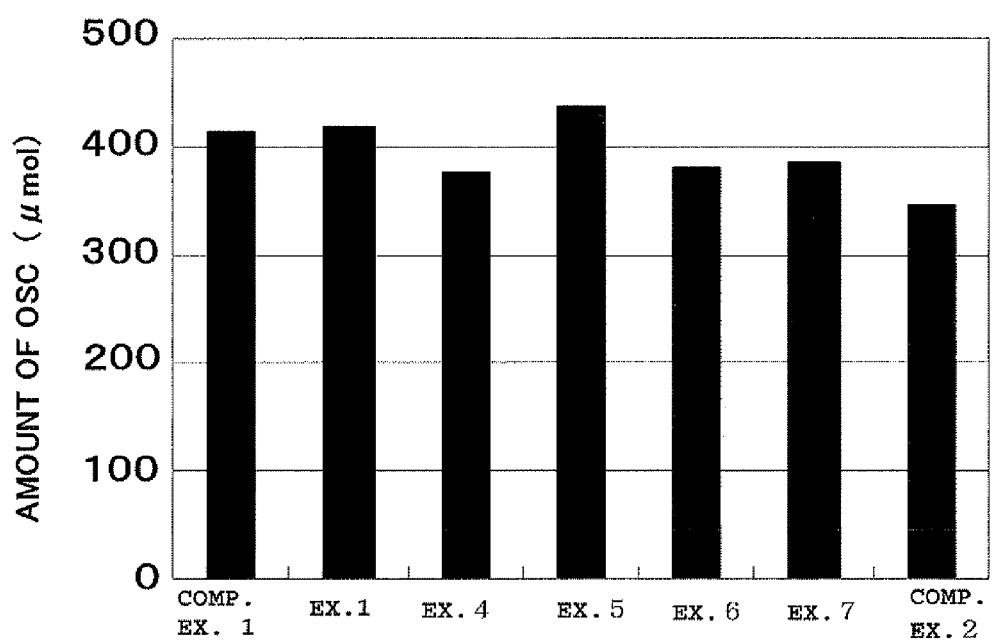
FIG. 4 is a graph showing amounts of OSC of the mixed pellet catalysts (Example 1, Examples 4 to 7, and Comparative Examples 1 and 2) after the durability test.

By use of each of the mixed pellet catalysts (Examples 1 to 7 and Comparative Examples 1 and 2) after the durability test, the amount of OSC was measured. In such a measurement of the amount of OSC, each catalyst sample was prepared by mixing 0.5 g of the corresponding one of the mixed pellet catalysts after the durability test with 0.5 g of silica glass sand. Then, to the sample, supply of an oxidizing gas containing $O_2$ (1% by volume) and $N_2$ (the balance) for 60 seconds and supply of a reducing gas containing CO (2% by volume) and $N_2$ (the balance) for 60 seconds were alternating performed at a gas flow rate of 7 L/minute. Note that the temperature of the gas entering the sample was set to 450° C. Then, while the reducing gas was being supplied, the concentration (% by volume) of $CO_2$ in the exiting gas was measured. The relationship between the duration of the feeding of the reducing gas and the concentration of $CO_2$ was plotted, and the integral amount of $CO_2$ was found. Note that, in this test, the obtained integral amount of $CO_2$ was used as the amount of OSC. Table 1 shows the obtained results. In addition, FIG. 4 shows a graph of the amounts of OSC of the mixed pellet catalysts obtained in Example 1, Examples 4 to 7, and Comparative Examples 1 and 2.

<Measurement of Amounts of Second Additional Element in Enriched Surface Region>

Figure 5:
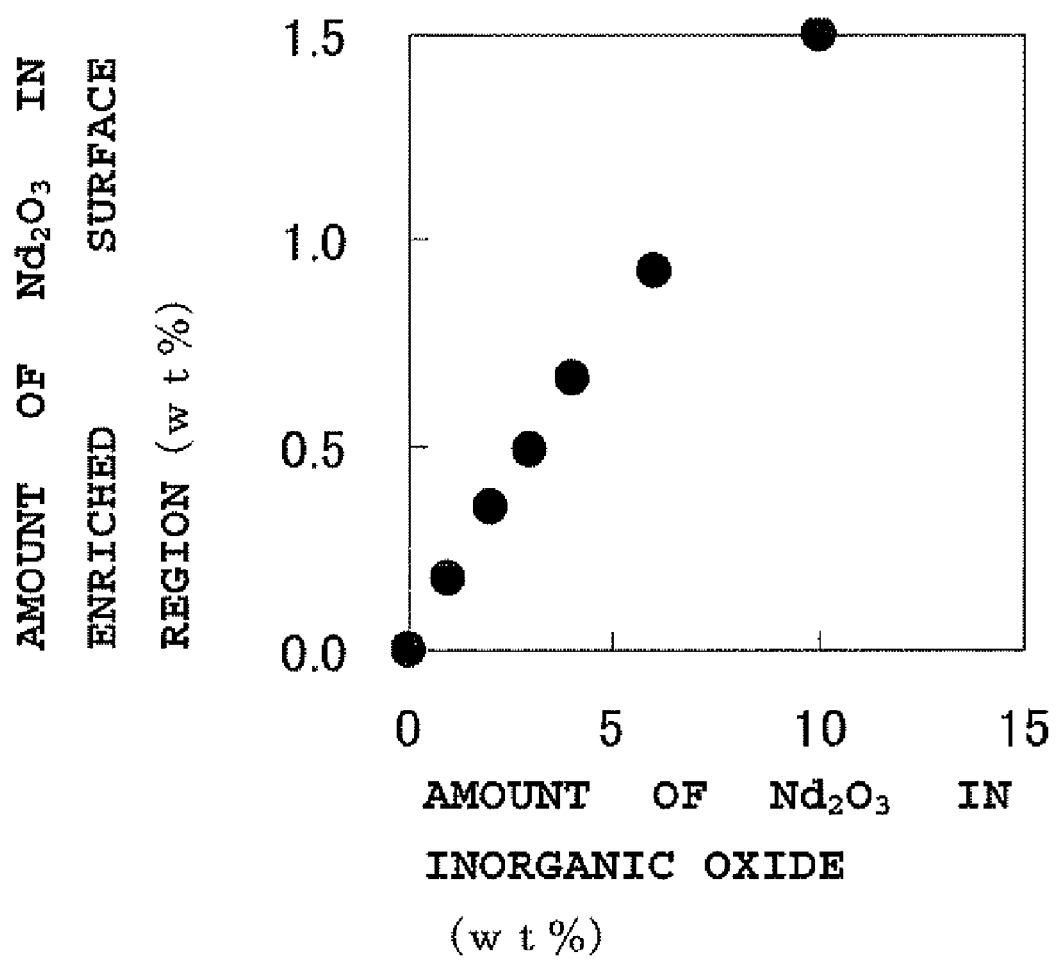
FIG. 5 is a graph showing a relationship between a total amount (% by mass) of $Nd_2O_3$ in each inorganic mixed oxide obtained in Example 1, Examples 4 to 7, and Comparative Examples 1 and 2 and an amount (% by mass) of $Nd_2O_3$ in an enriched surface region therein.

First, 0.1 g of each of the inorganic mixed oxides obtained in Examples 1 to 7 and Comparative Examples 1 and 2 was stirred in 10 ml of 0.1 N nitric acid for 2 hours. Then, the filtrate was extracted. Next, the content of the second additional element (Nd, La or Pr) dissolved in the obtained filtrate was measured by inductively coupled plasma atomic emission spectroscopy (ICP-AES). Then, while the content of the second additional element (Nd, La or Pr) dissolved in the filtrate was regarded as the content of the second additional element in the enriched surface region per 0.1 g of the inorganic mixed oxide, the content of the second additional element (Nd, La or Pr) relative to the whole amount of the inorganic mixed oxide was calculated. Table 1 shows the thus calculated ratio of the content of the second additional element in the enriched surface region. Note that, in Table 1, the content of the second additional element is a value converted into the mass of the oxide ($Nd_2O_3$, $La_2O$ or $Pr_2O_3$) in the inorganic mixed oxide (unit: % by mass). In addition, FIG. 5 shows a graph showing the relationship between the total amount (% by mass) of $Nd_2O_3$ in the inorganic mixed oxide and the amount (% by mass) of $Nd_2O_3$ in the enriched surface region, in each of the mixed pellet catalysts obtained in Example 1, Examples 4 to 7, and Comparative Examples 1 and 2.

the support was not sufficient. Meanwhile, regarding the catalyst for purification of exhaust gas obtained in Comparative Example 2, it is speculated that the performances were lowered because the content of the additional element in the enriched surface region was high, which resulted in not only reduction of the specific surface area, but also inhibition of conversion into Rh metal. The results shown in Table 1 and FIGS. 2 to 4 showed a tendency that, when the content of the

TABLE 1

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Number of moles of ions fed to solution (mol) | $Al_2$ | 200 | 200 | 200 | 200 | 200 | 200 | 200 | 200 | 200 |
| | Zr | 95 | 95 | 95 | 95 | 95 | 95 | 95 | 95 | 95 |
| | La | 29 | 29 | 29 | 29 | 29 | 29 | 29 | 29 | 29 |
| | Ce | 54 | 54 | 54 | 54 | 54 | 54 | 54 | 54 | 54 |
| Amount of second additional element, in terms of oxide, relative to total amount of inorganic mixed oxide (mass ratio in terms of oxide: % by mass) | | 1 ($Nd_2O_3$) | 2 ($La_2O_3$) | 2 ($Pr_2O_3$) | 2 ($Nd_2O_3$) | 3 ($Nd_2O_3$) | 4 ($Nd_2O_3$) | 6 ($Nd_2O_3$) | 0 ($Nd_2O_3$) | 10 ($Nd_2O_3$) |
| Composition ratio (at %) of metals in mixture | Al | 68.9 | 68.5 | 68.6 | 68.5 | 68.2 | 67.9 | 67.2 | 69.2 | 65.7 |
| | Zr | 16.4 | 16.3 | 16.3 | 16.3 | 16.2 | 16.1 | 16 | 16.4 | 15.6 |
| | Ce | 9.3 | 9.25 | 9.25 | 9.25 | 9.21 | 9.16 | 9.07 | 6.85 | 8.87 |
| | La | 4.99 | 5.95 | 4.97 | 4.97 | 4.94 | 4.92 | 4.87 | 5.02 | 4.77 |
| | Nd | 0.48 | — | — | 0.96 | 1.45 | 1.94 | 2.94 | 0 | 5.01 |
| | Pr | — | — | 0.95 | — | — | — | — | — | — |
| Content (at %) of total amount of first and second additional elements in inorganic oxide | | 5.47 | 5.95 | 5.92 | 5.93 | 6.39 | 6.86 | 7.81 | 5.02 | 9.77 |
| Content (C/CZ: at %) of cerium relative to total amount of cerium and zirconium | | 36.2 | 36.2 | 36.2 | 36.2 | 36.2 | 36.2 | 36.2 | 36.2 | 36.2 |
| Amount of second additional element in enriched surface region (mass ratio in terms of oxide: % by mass) | | 0.17 | 2.25* | 0.30 | 0.35 | 0.49 | 0.66 | 0.93 | 0 | 1.49 |
| NOx purification ratio | | 95.0 | 93.5 | 92.5 | 97.8 | 97.6 | 97.3 | 95.8 | 92.1 | 80.3 |
| HC-reforming ratio (%) | | 58.6 | 60.3 | 63.2 | 61.2 | 70.6 | 60.3 | 59.2 | 55 | 42.2 |
| Amount of OSC (μmol) | | 419.0 | 372.5 | 402.8 | 376.3 | 437.2 | 381.8 | 385.7 | 412.9 | 345.7 |

In Table 1,
*indicates that the value of the amount, shown in the table, of the second additional element in the enriched surface region of the inorganic mixed oxide obtained in Example 2 is the sum of the first additional element and the second additional element present in the enriched surface region.
Note that the amount of the second additional element in the enriched surface region of the inorganic mixed oxide obtained in Example 2 can be estimated to be in a range from 0.1 to 0.95% by mass.

As apparent from the results shown in Table 1 and FIGS. 2 to 4, it was found out that the catalysts for purification of exhaust gas of the present invention (Examples 1 to 7) had a sufficiently high heat resistance and were capable of exhibiting a high level of NOx purification performance, a high level of HC-reforming performance and a high level of OSC performance in a well-balanced manner even after the durability test. It was also found out that, when La, Pr or Nd was used as the second additional element, a sufficient effect was obtained, and that, when the content of La, Pr or Nd was 2% by mass, in terms of oxide, relative to the inorganic oxide, and especially when Nd was contained, the NOx purification activity was excellent.

Meanwhile, it was found out that the NOx purification performance and the HC-reforming performance were lowered in the catalyst for purification of exhaust gas (Comparative Example 1) of which the content of $Nd_2O_3$ in the enriched surface region was 0% by weight and in the catalyst for purification of exhaust gas (Comparative Example 2) of which the content of $Nd_2O_3$ in the enriched surface region was 1.49% by weight. Regarding the catalyst for purification of exhaust gas obtained in Comparative Example 1, it is speculated that the performances were lowered because the enriched surface region was not intentionally formed, whereby the stabilization of Rh on the outermost surface of additional element in the enriched surface region was excessive, not only the catalytic performances but also the OSC performance was lowered. Note that, in the inorganic mixed oxide obtained in Example 2, since the first and second additional elements were the same element (La), the amount of La determined by the above-described determination method of the content of the second additional element in the enriched surface region gave the sum of the first additional element (La) and the second additional element (La) which were present in the enriched surface region. For this reason, in the inorganic mixed oxide obtained in Example 2, the value of the content of the second additional element in the enriched surface region shown in the table is greater than 0.95% by mass. However, it is speculated, from the results of other examples (for example, Examples 3 and 4) and the like, that the content of the second additional element in the enriched surface region is in a range from 0.1 to 0.95% by mass, in terms of oxide.

<XPS Measurement on Inorganic Mixed Oxides Obtained in Example 1, Examples 4 to 7, and Comparative Examples 1 and 2>

Figure 6:
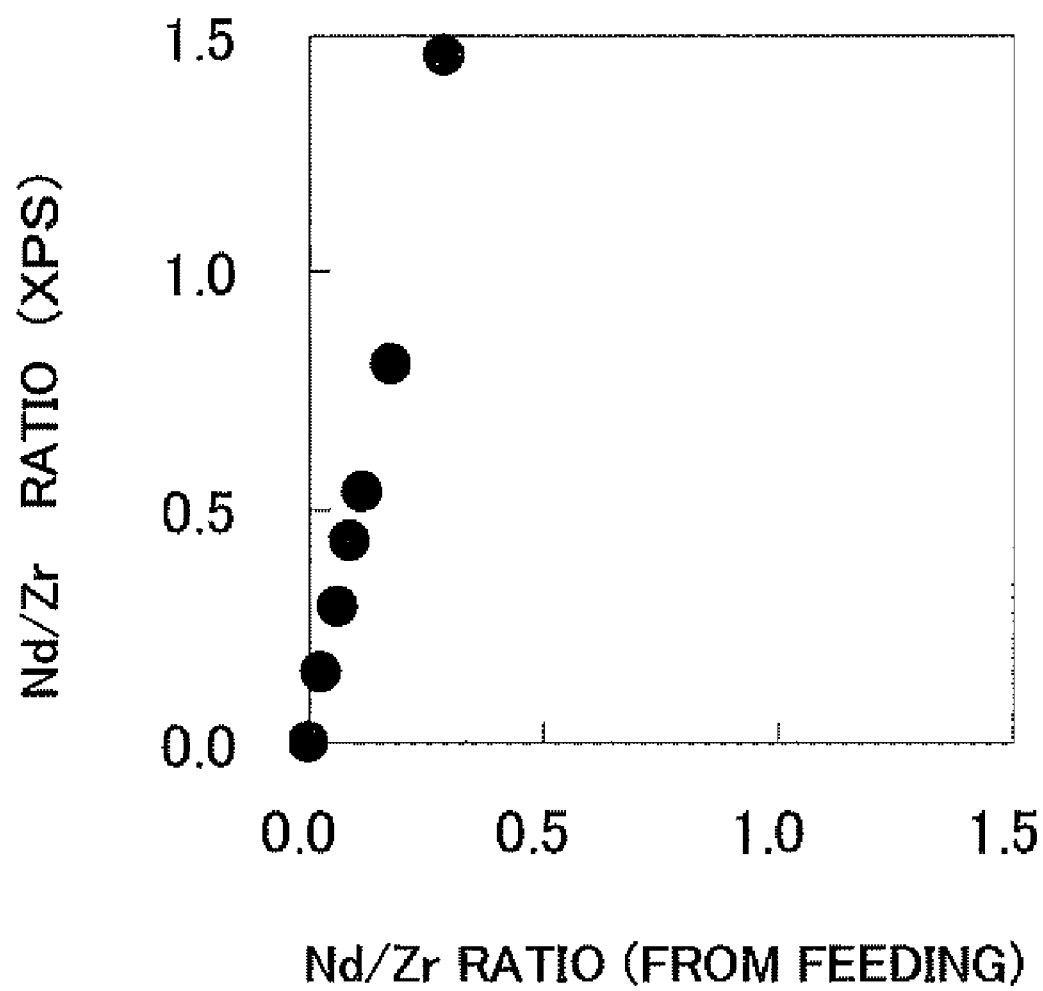
FIG. 6 is a graph showing a relationship between a content ratio (Nd/Zr:atomic ratio) between zirconium and neodymium obtained by XPS measurement and a content ratio (Nd/Zr:atomic ratio) between zirconium and neodymium calculated from fed amounts in each of the inorganic mixed oxides obtained in Example 1, Examples 4 to 7, and Comparative Examples 1 and 2.

By use of the inorganic mixed oxides obtained in Example 1, Examples 4 to 7, and Comparative Examples 1 and 2, the content ratio (atomic ratio) between zirconium and neodymium in the vicinity of the surface of each of the inorganic mixed oxides was determined by X-ray photoemission spectroscopy (XPS). FIG. 6 shows a graph showing a relationship between the content ratio (Nd/Zr:atomic ratio) between zirconium and neodymium obtained by the XPS measurement and the content ratio (Nd/Zr:atomic ratio) between zirconium and neodymium calculated from the fed amounts.

As apparent from the results shown in FIG. 6, it was found out that, in each of the inorganic mixed oxides, the content ratio between zirconium and neodymium obtained by the XPS measurement was larger than and has a proportional relationship with the content ratio between zirconium and neodymium calculated from the fed amounts. It was found out from such results that, in the inorganic mixed oxide obtained in each of Examples and Comparative Examples, the vicinity of the surface was enriched with $Nd_2O_3$.

<Evaluation of Characteristics by EPMA>

By use of the mixed pellet catalysts (Example 4 and Comparative Example 1) after the durability test, EPMA measurement was performed. For the measurement, first, 2 cc of a hardener manufactured by Marumoto Struers K. K. under the product name of "'EpoFix' Hardener" was added to 15 cc of a resin manufactured by Marumoto Struers K. K. under the product name of "'EpoFix' Resin," followed by stirring. The mixture was heated under a temperature condition of 40° C. for one minute, and then further stirred. To apart thereof, 0.1 g of the mixed pellet catalyst after the durability test was added, followed by mixing. Then, the mixture was fed into a cylindrical plastic container having a diameter of 2 cm and a height of 3 cm. Then, the inside of the cylinder was evacuated with a vacuum pump. Thereafter, the rest of the resin containing the hardener was placed on the mixture to a height of approximately 2 cm, and the inside of the cylinder was evacuated with a vacuum pump. Then, the resin was hardened by standing at room temperature (25° C.) for 2 days. Then, after a bottom surface was ground with a wet grinder, the bottom surface was measured by use of JXA-8200 manufactured by JEOL Ltd. under conditions of an acceleration voltage of 15 kV, and an illumination current of 0.3 µA. An image analysis was performed on the results for distinguishing Rh on the inorganic mixed oxide of the present invention from Rh on the support for Pt. Then, on the basis of the ratio of areas of Rh, the degree of migration of Rh to the support for Pt was determined.

According to the results of such determination, the degree of migration of Rh in the mixed pellet catalyst obtained in Example 4 was 13.4%, whereas the degree of migration in the mixed pellet catalyst obtained in Comparative Example 1 was 20.9%. These results showed that the formation of the enriched surface region increased the stability of Rh, and made it possible to inhibit the migration of Rh to the support for Pt even after the durability test, whereby a larger amount of active Rh remained on the support.

According to the above-described results, it is found out that Nd is more preferable as the second additional element, and the above-described results showed that the enriched surface region was formed in each of the inorganic mixed oxides obtained in Examples 1 to 7. Accordingly, in the following examples, Nd was used as the second additional element, and the amount of Nd (in terms of $Nd_2O_3$) fed was set to 2% by mass relative to the whole amount of the inorganic mixed oxide.

Examples 8 to 10 and Comparative Examples 3 and 4

Each inorganic mixed oxide, each catalyst for purification of exhaust gas and each mixed pellet catalyst were produced in the same manner as in Example 1, except that each component had a content shown in Table 2. Note that, in Comparative Example 3, no cerium nitrate hexahydrate was used.

Figure 7:
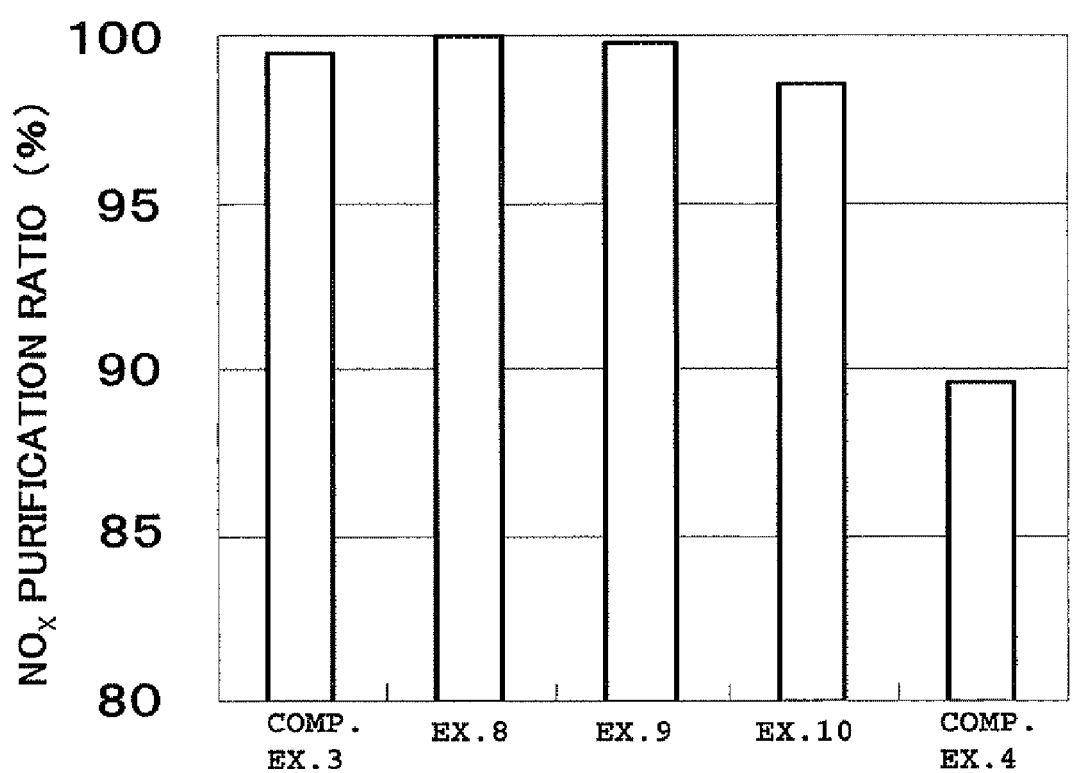
FIG. 7 is a graph showing NOx purification ratios of mixed pellet catalysts (Examples 8 to 10 and Comparative Examples 3 and 4) after a durability test.
Figure 8:
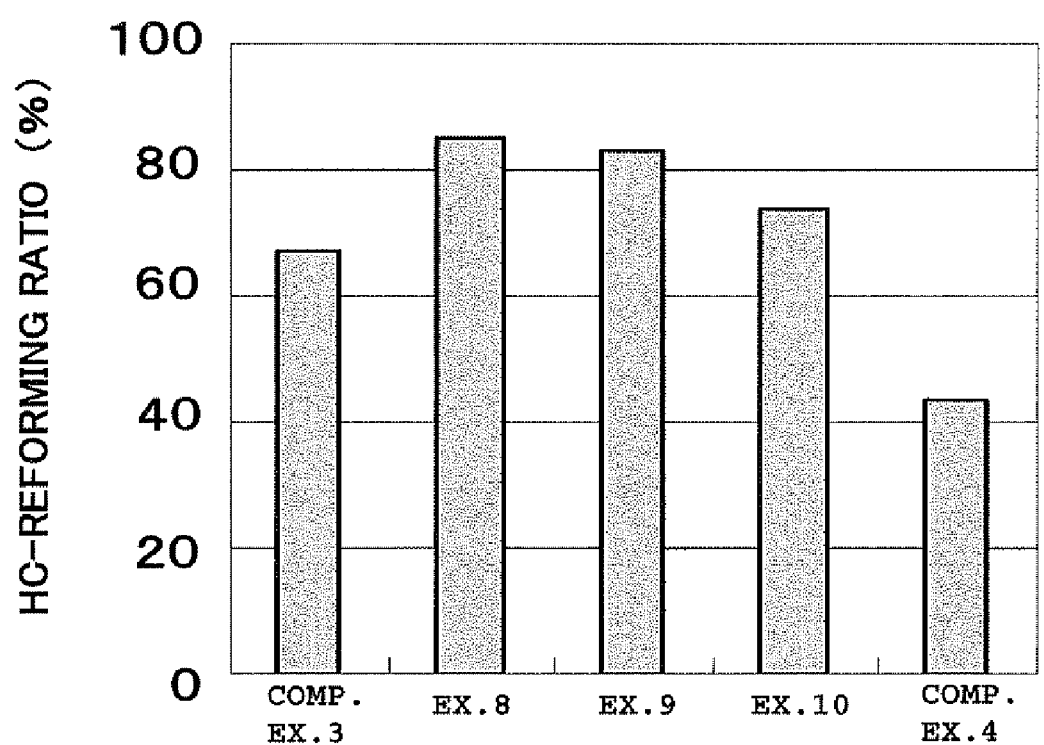
FIG. 8 is a graph showing HC-reforming ratios of the mixed pellet catalysts (Examples 8 to 10 and Comparative Examples 3 and 4) after the durability test.
Figure 9:
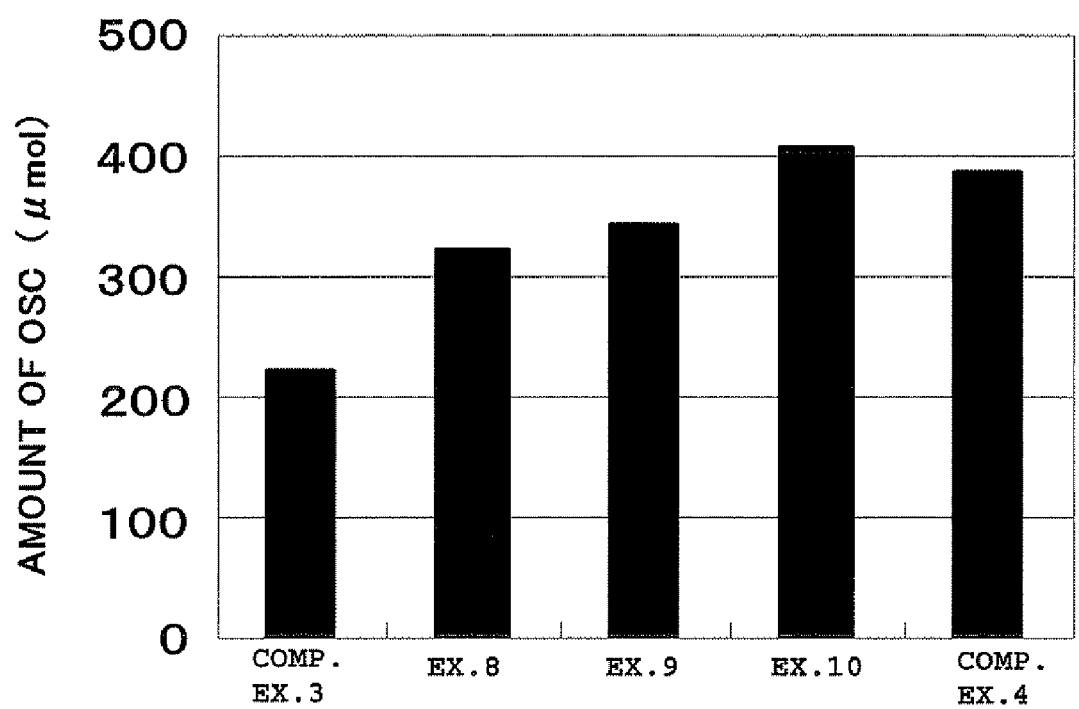
FIG. 9 is a graph showing amounts of OSC of the mixed pellet catalysts (Examples 8 to 10 and Comparative Examples 3 and 4) after the durability test.

By use of the inorganic mixed oxides and the mixed pellet catalysts (Examples 8 to 10 and Comparative Examples 3 and 4) obtained as described above, a heat-resistance test was performed by employing the same method as described above. Then, measurement of NOx purification ratios, measurement of HC-reforming ratios, and measurement of amounts of OSC were performed. Table 2 and FIGS. 7 to 9 show the obtained results. Note that FIG. 7 is a graph showing the NOx purification ratio of each of the catalysts, FIG. 8 is a graph showing the HC-reforming ratio of each of the catalysts, and FIG. 9 is a graph showing the amount of OSC of each of the catalysts.

<Measurement of Ratio of Specific Surface Area Retained (Ratio of SSA Retained)>

Specific surface areas of each of the mixed pellet catalysts (Examples 9 and 10 and Comparative Example 4) before the durability test and of each of the mixed pellet catalysts (Examples 9 and 10 and Comparative Example 4) after the durability test were determined by $N_2$ adsorption (the BET single-point method) by use of a full-automatic specific surface area-measuring device (Micro Sorp 4232 II) manufactured by Micro Data Co., Ltd. Then, from the thus determined specific surface areas, a ratio of SSA retained was found by calculation using the following equation:

[Ratio of SSA retained (%)]=([Specific surface area of catalyst after durability test]/[Specific surface area of catalyst before durability test])×100.

Figure 10:
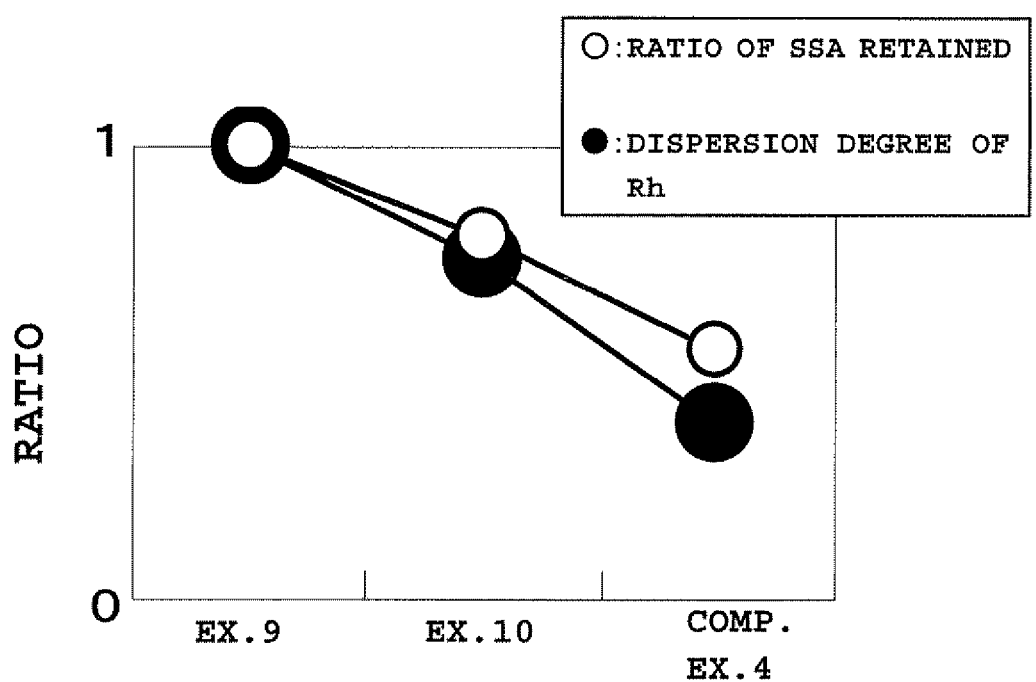
FIG. 10 is a graph showing ratios of SSA retained and dispersion degrees of Rh of the mixed pellet catalysts (Examples 9 and 10 and Comparative Example 4) after the durability test.

FIG. 10 shows the results of relative comparison which was made with the ratio of SSA retained of the catalyst obtained in Example 2 taken as the reference.

<Measurement of Dispersion Degree of Rh>

A dispersion degree of Rh of each of the mixed pellet catalysts (Examples 9 and 10 and Comparative Example 4) after the durability test was measured. In the measurement of such dispersion degree of Rh, a CO-pulse measurement method was employed. Specifically, first, each of the mixed pellet catalysts after the durability test was heated to a temperature of 400° C. over 15 minutes under a gas atmosphere of $O_2$ (100% by volume), and then held for 15 minutes. Next, the gas atmosphere was changed to a gas atmosphere of He (100% by volume), and then held at 400° C. for 10 minutes. Subsequently, the gas atmosphere was changed to a gas atmosphere of $H_2$ (100% by volume), and then held at 400° C. for 15 minutes. Thereafter, the gas atmosphere was further changed to a gas atmosphere of He (100% by volume), and held at 400° C. for 10 minutes. While the gas atmosphere of He (100% by volume) was kept, natural cooling was performed to room temperature (25° C.). Subsequently, each of the mixed pellet catalysts was cooled under a gas atmosphere of He (100% by volume) to the temperature of dry ice-ethanol (−78° C.). Thereafter, under the gas atmosphere of He (100% by volume), each of the mixed pellet catalysts was subjected to five pulses with CO at 0.7 µmol/pulse. Then, an amount of CO which was in the pulses but which did not adsorb onto the catalyst was detected, by use of a thermal conductivity detector. Then, the amount of CO adsorbed was determined on the basis of the number of pulses and the TCD area at the time of saturation of the adsorption. Then, from the obtained amount of CO adsorbed and the amount of Rh supported, the dispersion degree of Rh was obtained by calculation using the following equation:

[Dispersion degree of Rh (%)]=([Amount of CO adsorbed (mol)]/[Amount of Rh supported (mol)])×100.

FIG. 10 shows the result of relative comparison which was made with the dispersion degree of Rh of the catalyst obtained in Example 2 taken as the reference.

TABLE 2

|  |  | Example 8 | Example 9 | Example 10 | Comparative Example 3 | Comparative Example 4 |
|---|---|---|---|---|---|---|
| Number of moles of ions fed to solution (mol) | $Al_2$ | 200 | 200 | 200 | 200 | 200 |
|  | Zr | 95 | 95 | 95 | 95 | 95 |
|  | La | 9 | 19 | 29 | 5 | 52 |
|  | Ce | 10 | 21 | 54 | 0 | 100 |
| Amount of second additional element relative to total amount of inorganic mixed oxide (amount of $Nd_2O_3$ in inorganic oxide: % by mass) |  | 2 | 2 | 2 | 2 | 2 |
| Composition ratio (at %) of metals in mixture | Al | 77.2 | 74.1 | 68.5 | 79.4 | 61.2 |
|  | Zr | 18.3 | 17.6 | 16.3 | 18.9 | 14.5 |
|  | Ce | 1.93 | 3.89 | 9.25 | 0 | 15.3 |
|  | La | 1.74 | 3.52 | 4.97 | 0.99 | 7.95 |
|  | Nd | 0.83 | 0.87 | 0.96 | 0.79 | 1.07 |
| Content (at %) of total amount of first and second additional elements (Nd + La) in inorganic oxide |  | 2.56 | 4.39 | 5.93 | 1.78 | 9.02 |
| Content (C/CZ: at %) of cerium relative to total amount of cerium and zirconium |  | 9.5 | 18.1 | 36.2 | 0 | 51.3 |
| NOx purification ratio |  | 100 | 99.8 | 98.6 | 99.5 | 89.6 |
| HC-reforming ratio (%) |  | 85.3 | 83.1 | 73.9 | 67.3 | 43.8 |
| Amount of OSC (μmol) |  | 321.8 | 343.9 | 407.5 | 221.8 | 386.8 |

As apparent from the results shown in Table 2 and FIGS. 7 to 9, it was found out that the catalysts for purification of exhaust gas of the present invention (Examples 8 to 10) had a high NOx purification ratio, a high HC-reforming ratio and a large amount of OSC even after the durability test. Specifically, it was found out that each of the catalysts for purification of exhaust gas of the present invention had a sufficiently high heat resistance, and was capable of exhibiting a high level of NOx purification performance, a high level of HC-reforming performance and a high level of OSC performance in a well-balanced manner even after the durability test. Moreover, it was found out that, among the catalysts for purification of exhaust gas of the present invention (Examples 8 to 10), as the content of cerium relative to the total amount of all elements which form cations in the inorganic mixed oxide increased, the amount of OSC increased proportionally thereto. According to FIG. 10, it was found out that each of the catalysts for purification of exhaust gas of the present invention (Examples 9 and 10) had the ratio of the specific surface area retained and the dispersion degree of Rh at sufficiently high levels.

In contrast, although the catalyst for purification of exhaust gas obtained in Comparative Example 3 exhibited a high NOx purification ratio even after the durability test, the HC-reforming ratio and the amount of OSC thereof were not sufficient. Note that the amount of OSC of the catalyst for purification of exhaust gas obtained in Comparative Example 3 was mainly due to the mixed support for Pt. It is speculated that such results were obtained because the catalyst for purification of exhaust gas obtained in Comparative Example 3 did not contain cerium.

Meanwhile, it was found out that, although the catalyst for purification of exhaust gas obtained in Comparative Example 4 had a certain high level of amount of OSC even after the durability test, the NOx purification ratio and the HC-reforming ratio were not sufficient. The above-described decrease in the NOx purification ratio and the HC-reforming ratio of the catalyst for purification of exhaust gas obtained in Comparative Example 4 can be attributed to the low ratio of the specific surface area retained and the low dispersion degree of Rh, as apparent from FIG. 10. Moreover, in the catalyst for purification of exhaust gas obtained in Comparative Example 4, although the content of cerium was higher than those of the catalysts for purification of exhaust gas of the present invention (Examples 8 to 10), the amount of OSC was smaller than those of the catalysts for purification of exhaust gas of the present invention (Examples 8 to 10). It is speculated that this was caused because the efficiency of conversion of the valence of cerium ions (the efficiency of conversion between $Ce^{4+}$ and $Ce^{3+}$) was lowered, when the content of cerium relative to the total amount of zirconium and cerium in the inorganic mixed oxide (in the table, described as "C/CZ") exceeded 50 at %. Such results showed that, in order to utilize cerium without waste and obtain a high catalytic activity, it is necessary to set the content of cerium (C/CZ) to 50 at % or less.

Examples 11 to 13 and Comparative Examples 5 and 6

Each inorganic mixed oxide, each catalyst for purification of exhaust gas and each mixed pellet catalyst were produced in the same manner as in Example 1, except that each component had a content shown in Table 3. Note that, in each of the catalysts for purification of exhaust gas which were produced to have the contents shown in Table 3, the content of ceria per weight of each of the catalysts was approximately 10% by mass, and the theoretical amounts of OSC of the catalysts were substantially the same.

Figure 11:
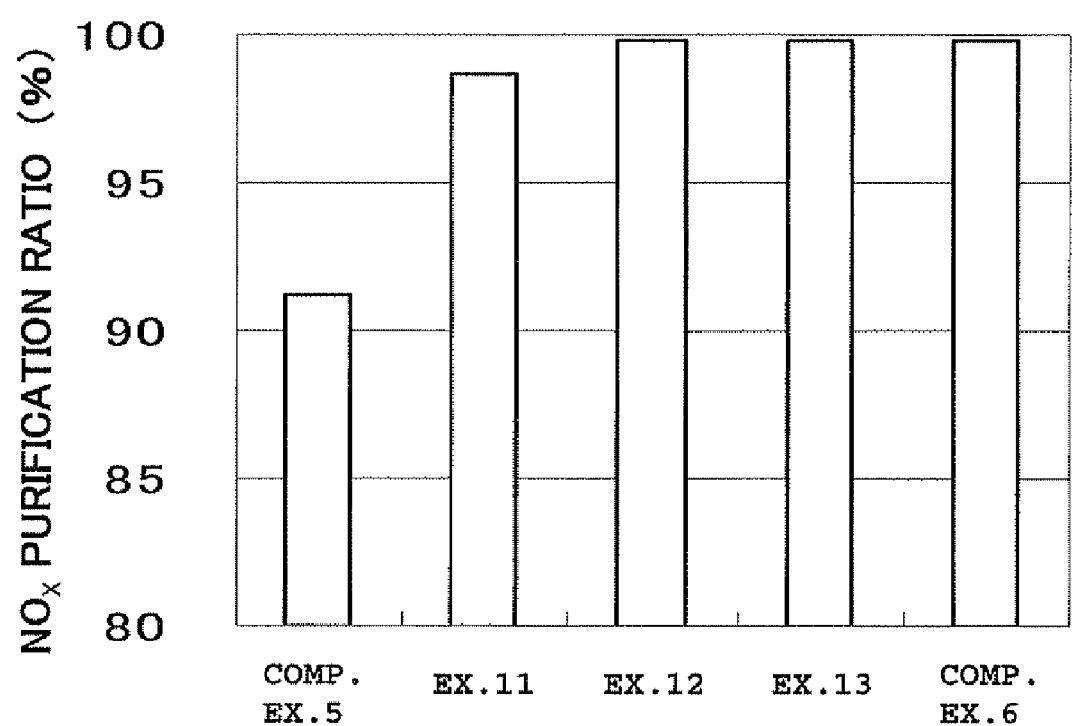
FIG. 11 is a graph showing NOx purification ratios of mixed pellet catalysts (Examples 11 to 13 and Comparative Examples 5 and 6) after a durability test.
Figure 12:
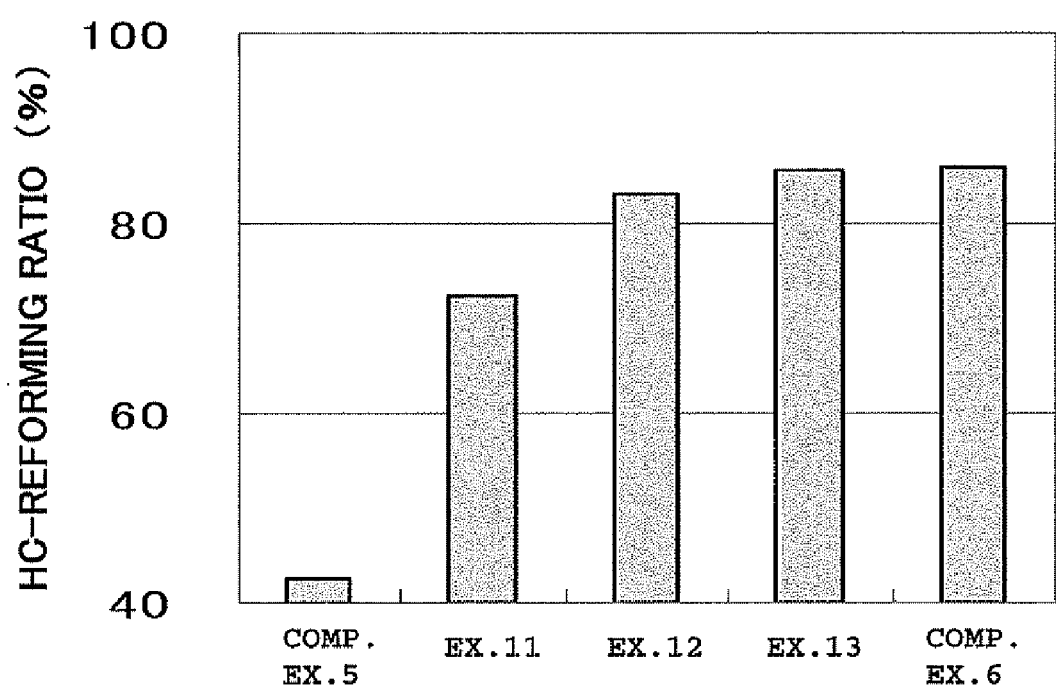
FIG. 12 is a graph showing HC-reforming ratios of the mixed pellet catalysts (Examples 11 to 13 and Comparative Examples 5 and 6) after the durability test.
Figure 13:
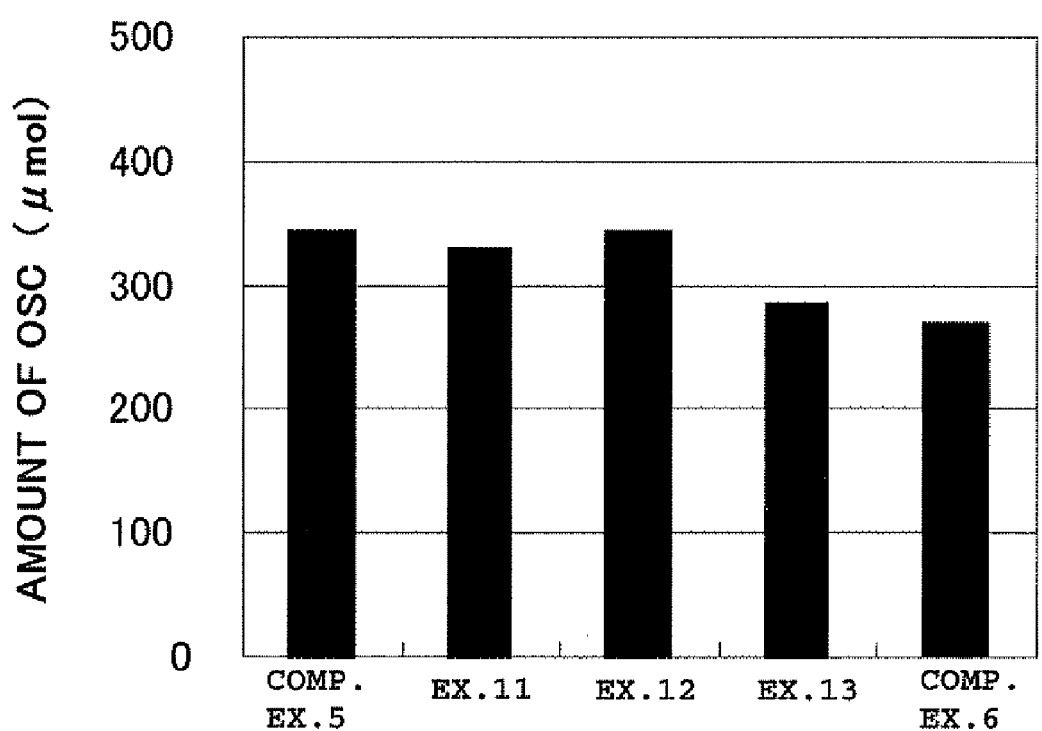
FIG. 13 is a graph showing amounts of OSC of the mixed pellet catalysts (Examples 11 to 13 and Comparative Examples 5 and 6) after the durability test.

By use of the inorganic mixed oxides and the mixed pellet catalysts (Examples 11 to 13 and Comparative Examples 5 and 6) obtained as described above, a heat-resistance test was performed by employing the same method as described above. Then, measurement of NOx purification ratios, measurement of HC-reforming ratios, and measurement of amounts of OSC were performed. Table 3 and FIGS. 11 to 13 show the obtained results. Note that FIG. 11 is a graph showing the NOx purification ratio of each of the catalysts, FIG. 12 is a graph showing the HC-reforming ratio of each of the catalysts, and FIG. 13 is a graph showing the amount of OSC of each of the catalysts.

TABLE 3

|  |  | Example 11 | Example 12 | Example 13 | Comparative Example 5 | Comparative Example 6 |
|---|---|---|---|---|---|---|
| Number of moles of ions fed to solution (mol) | $Al_2$ | 200 | 200 | 200 | 200 | 200 |
|  | Zr | 150 | 95 | 30 | 400 | 15 |
|  | La | 30 | 19 | 6 | 80 | 3 |
|  | Ce | 29 | 23 | 16 | 54 | 15 |
| Amount of second additional element relative to total amount of inorganic mixed oxide (amount of $Nd_2O_3$ in inorganic oxide: % by mass) |  | 2 | 2 | 2 | 2 | 2 |
| Composition ratio (at %) of metals in mixture | Al | 65.1 | 73.8 | 87.8 | 42.3 | 91.7 |
|  | Zr | 24.4 | 17.5 | 6.59 | 42.3 | 3.44 |
|  | Ce | 4.72 | 4.25 | 3.51 | 5.71 | 3.44 |
|  | La | 4.88 | 3.51 | 1.32 | 8.46 | 0.69 |
|  | Nd | 0.96 | 0.88 | 0.74 | 1.18 | 0.70 |
| Content (at %) of total amount of first and second additional elements (Nd + La) in inorganic oxide |  | 5.84 | 4.38 | 2.06 | 9.65 | 1.39 |
| Content (C/CZ: at %) of cerium relative to total amount of cerium and zirconium |  | 16.2 | 19.5 | 34.8 | 11.9 | 50.0 |
| NOx purification ratio |  | 98.7 | 99.8 | 99.8 | 91.2 | 99.8 |
| HC-reforming ratio (%) |  | 72.4 | 83.1 | 85.8 | 42.6 | 86.0 |
| Amount of OSC (μmol) |  | 328.5 | 343.9 | 285.1 | 343.8 | 270.5 |

Examples 14 to 16 and Comparative Examples 7 and 8

Each inorganic mixed oxide, each catalyst for purification of exhaust gas and each mixed pellet catalyst were produced in the same manner as in Example 1, except that each component had a content shown in Table 4. Note that, in each of the catalysts for purification of exhaust gas which were produced to have the contents shown in Table 4, the content of ceria per weight of each of the catalysts was approximately 20% by mass, and the theoretical amounts of OSC of the catalysts were substantially the same.

Figure 14:
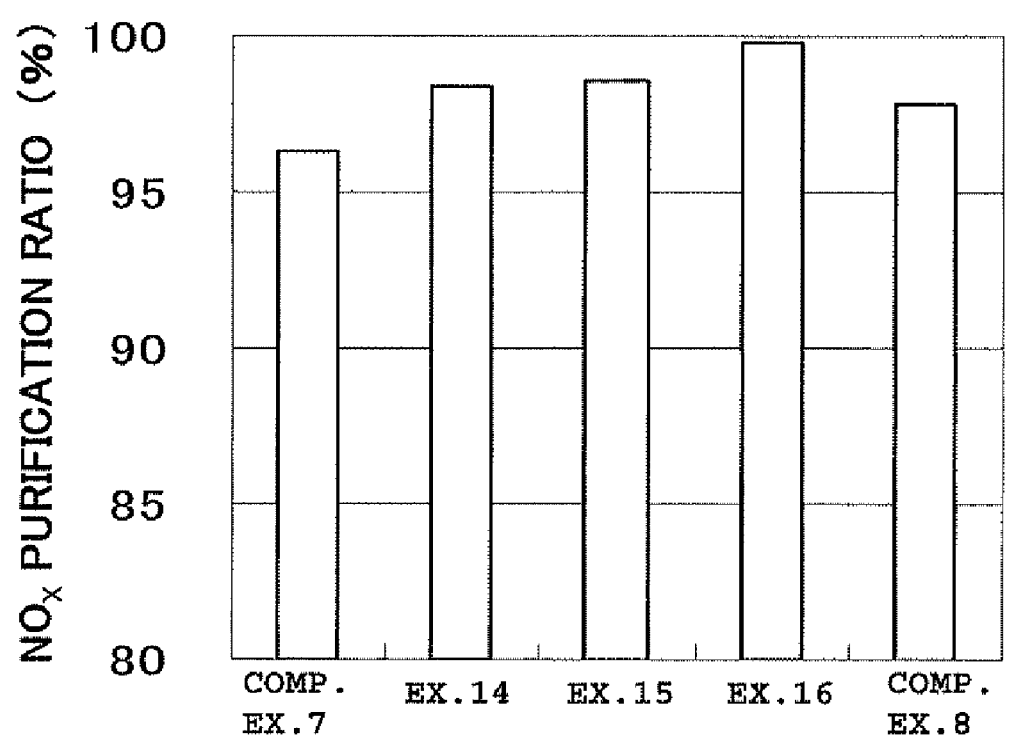
FIG. 14 is a graph showing NOx purification ratios of mixed pellet catalysts (Examples 14 to 16 and Comparative Examples 7 and 8) after a durability test.
Figure 15:
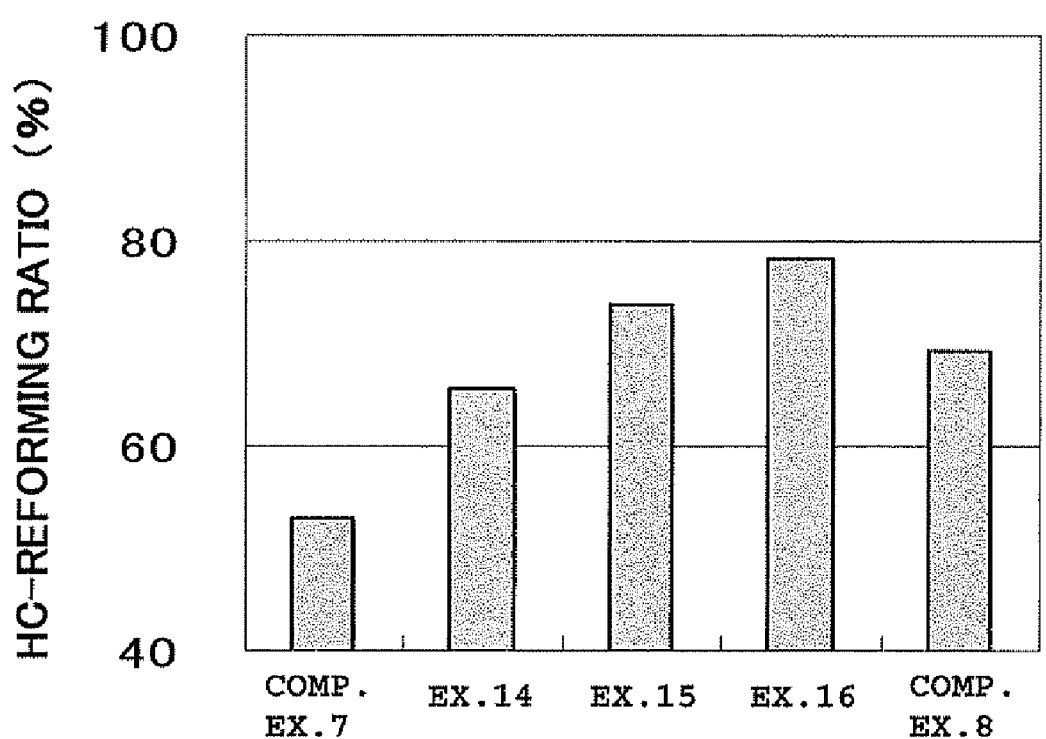
FIG. 15 is a graph showing HC-reforming ratios of the mixed pellet catalysts (Examples 14 to 16 and Comparative Examples 7 and 8) after the durability test.
Figure 16:
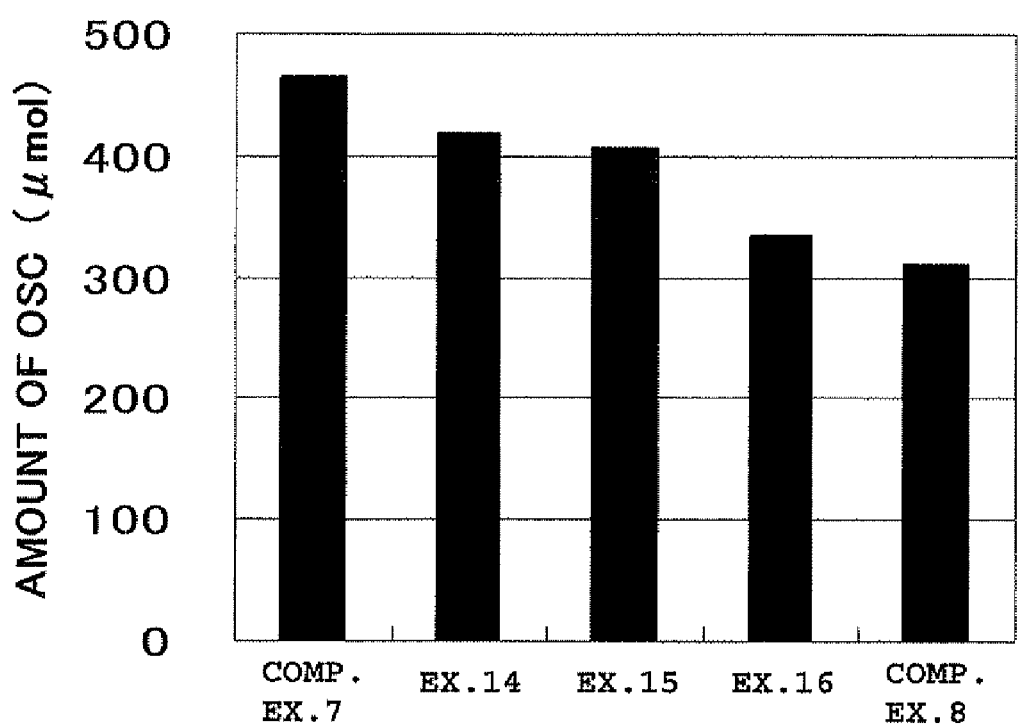
FIG. 16 is a graph showing of amounts of OSC of the mixed pellet catalysts (Examples 14 to 16 and Comparative Examples 7 and 8) after the durability test.

By use of the inorganic mixed oxides and the mixed pellet catalysts (Examples 14 to 16 and Comparative Examples 7 and 8) obtained as described above, a heat-resistance test was performed by employing the same method as described above. Then, measurement of NOx purification ratios, measurement of HC-reforming ratios, and measurement of amounts of OSC were performed. Table 4 and FIGS. 14 to 16 show the obtained results. Note that FIG. 14 is a graph showing the NOx purification ratio of each of the catalysts, FIG. 15 is a graph showing HC-reforming ratio of each of the catalysts, and FIG. 16 is a graph showing the amount of OSC of each of the catalysts.

TABLE 4

|  |  | Example 14 | Example 15 | Example 16 | Comparative Example 7 | Comparative Example 8 |
|---|---|---|---|---|---|---|
| Number of moles of ions fed to solution (mol) | $Al_2$ | 200 | 200 | 200 | 200 | 200 |
|  | Zr | 130 | 95 | 40 | 350 | 20 |
|  | La | 40 | 29 | 12 | 107 | 6 |
|  | Ce | 62 | 54 | 40 | 117 | 35 |
| Amount of second additional element relative to total amount of inorganic mixed oxide (amount of $Nd_2O_3$ in inorganic oxide: % by mass) |  | 2 | 2 | 2 | 2 | 2 |
| Composition ratio (at %) of metals in mixture | Al | 62.7 | 68.5 | 80.6 | 40.6 | 86.1 |
|  | Zr | 20.4 | 16.3 | 8.06 | 35.5 | 4.30 |
|  | Ce | 9.71 | 9.25 | 8.06 | 11.9 | 7.53 |
|  | La | 6.26 | 4.97 | 2.42 | 10.9 | 1.29 |
|  | Nd | 1.02 | 0.96 | 0.84 | 1.24 | 0.78 |
| Content (at %) of total amount of first and second additional elements (Nd + La) in inorganic oxide |  | 7.28 | 5.93 | 3.25 | 12.1 | 2.07 |
| Content (C/CZ: at %) of cerium relative to total amount of cerium and zirconium |  | 32.3 | 36.2 | 50.0 | 25.1 | 63.6 |
| NOx purification ratio |  | 98.4 | 98.6 | 99.8 | 96.4 | 97.8 |
| HC-reforming ratio (%) |  | 65.7 | 73.9 | 78.3 | 52.9 | 69.4 |
| Amount of OSC (μmol) |  | 418.2 | 407.5 | 333.1 | 464.3 | 311.2 |

As apparent from the results shown in Tables 3 and 4 and FIGS. 11 to 16, it was found out that the catalysts for purification of exhaust gas of the present invention (Examples 11 to 16) had a sufficiently high heat resistance, and were capable of exhibiting a high level of NOx purification performance, a high level of HC-reforming performance and a high level of OSC performance in a well-balanced manner even after the durability test. Meanwhile, it was found out that the catalysts for purification of exhaust gas for comparison (Comparative Examples 5 and 7 to 8) were not capable of exhibiting the NOx purification performance and the HC-reforming performance at high levels in a well-balanced manner. In particular, in the catalysts for purification of exhaust gas (Comparative Example 5 and Comparative Example 7) in which the content of aluminum in the inorganic mixed oxide was less than 60 at % in terms of element content, the NOx purification performance and the HC-reforming performance were not sufficient. It is speculated that such results were obtained because, in each of the catalysts for purification of exhaust gas obtained in Comparative Example 5 and Comparative Example 7, the grain growth of primary particles of the zirconium oxide, the cerium oxide and the composite oxide thereof in the inorganic mixed oxide was not inhibited sufficiently because of the low content of aluminum.

Examples 17 to 22 and Comparative Example 9

Each inorganic mixed oxide, each catalyst for purification of exhaust gas and each mixed pellet catalyst were produced in the same manner as in Example 1, except that each component had a content shown in Table 5.

Figure 17:
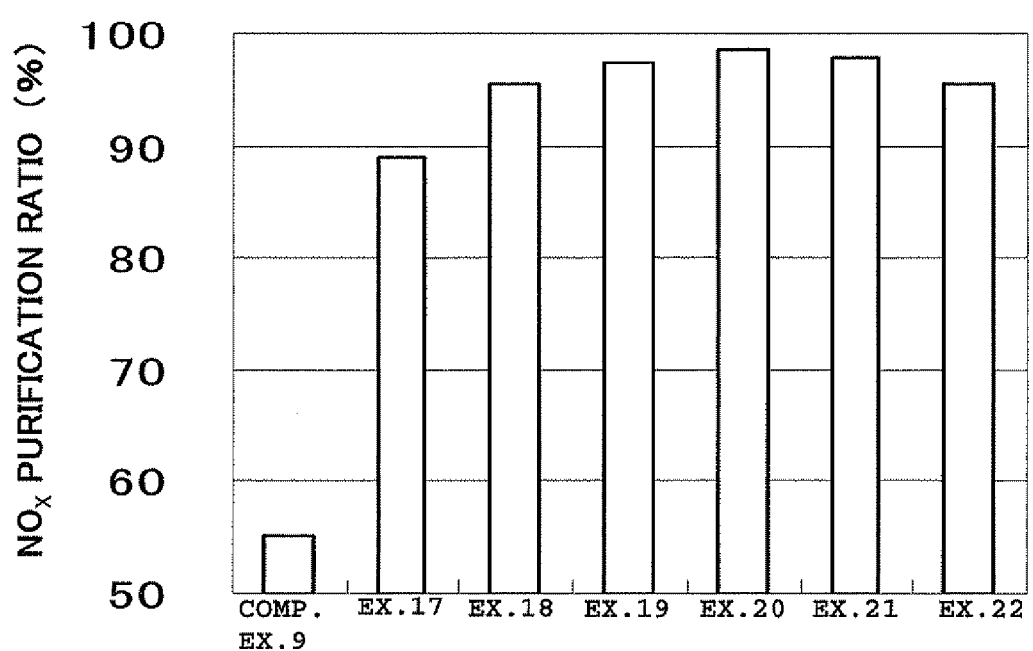
FIG. 17 is a graph showing NOx purification ratios of mixed pellet catalysts (Examples 17 to 22 and Comparative Example 9) after a durability test.
Figure 18:
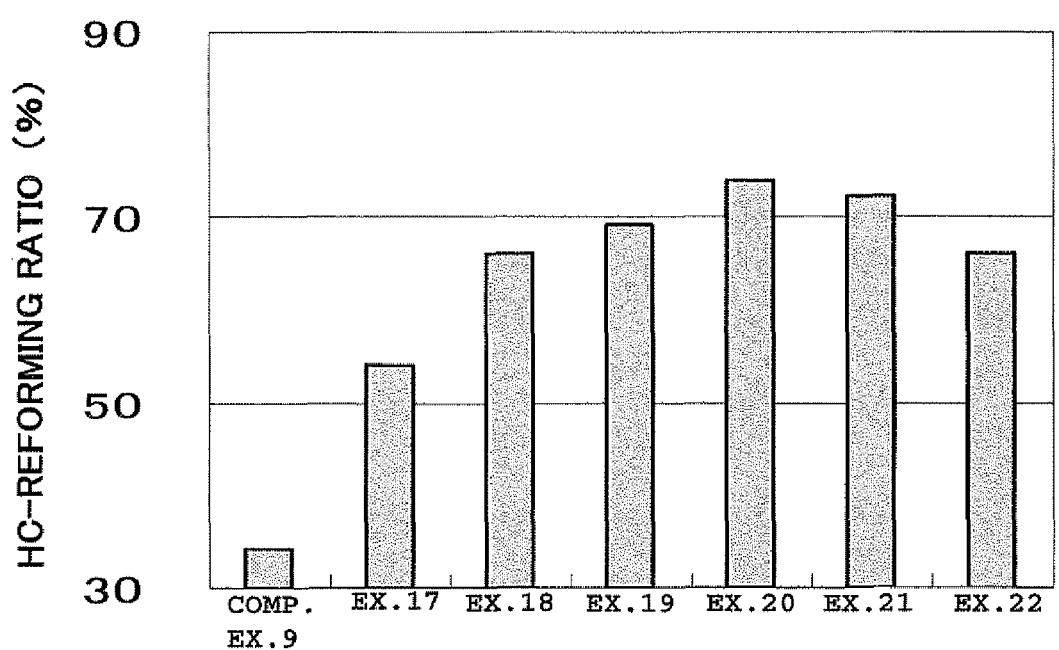
FIG. 18 is a graph showing HC-reforming ratios of the mixed pellet catalysts (Examples 17 to 22 and Comparative Example 9) after the durability test.
Figure 19:
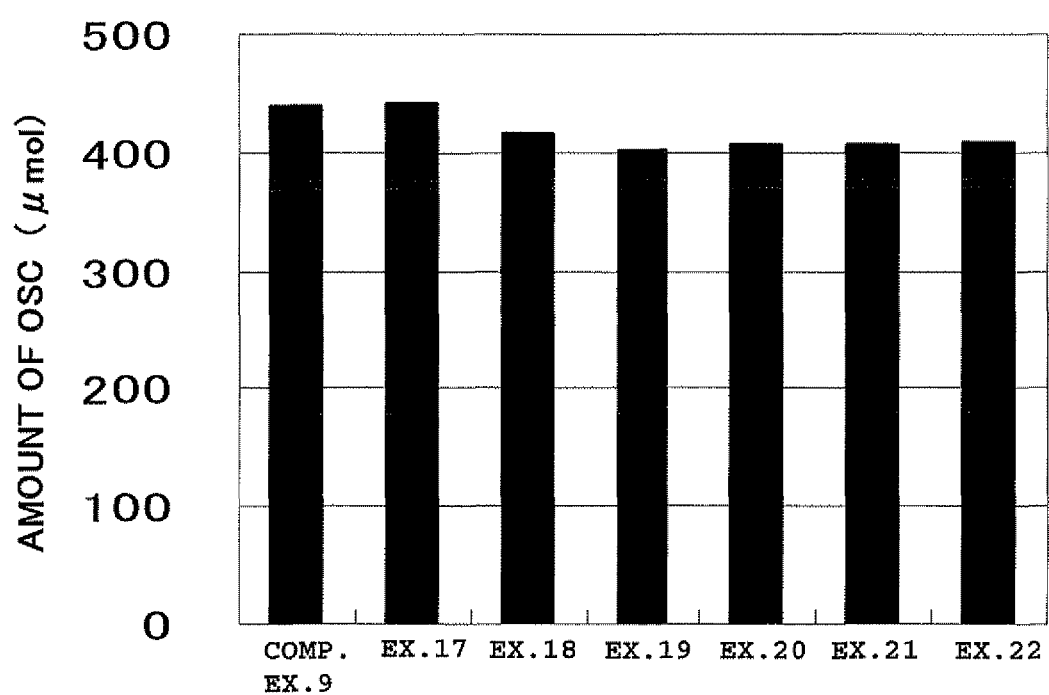
FIG. 19 is a graph showing amounts of OSC of the mixed pellet catalysts (Examples 17 to 22 and Comparative Example 9) after the durability test.

By use of the inorganic mixed oxides and the mixed pellet catalysts (Examples 17 to 22 and Comparative Example 9) obtained as described above, a heat-resistance test was performed by employing the same method as described above. Then, measurement of NOx purification ratios, measurement of HC-reforming ratios, and measurement of amounts of OSC were performed. Table 5 and FIGS. 17 to 19 show the obtained results. Note that FIG. 17 is a graph showing the NOx purification ratio of each of the catalysts, FIG. 18 is a graph showing the HC-reforming ratio of each of the catalysts, and FIG. 19 is a graph showing the amount of OSC of each of the catalysts.

TABLE 5

| | | Example 17 | Example 18 | Example 19 | Example 20 | Example 21 | Example 22 | Comparative Example 9 |
|---|---|---|---|---|---|---|---|---|
| Number of moles of ions fed to solution (mol) | $Al_2$ | 200 | 200 | 200 | 200 | 200 | 200 | 200 |
| | Zr | 95 | 95 | 95 | 95 | 95 | 95 | 95 |
| | La | 5 | 11 | 20 | 29 | 38 | 58 | 0 |
| | Ce | 49 | 50 | 52 | 54 | 56 | 61 | 48 |
| Amount of second additonal element relative to total amount of inorganic mixed oxide (amount of $Nd_2O_3$ in inorganic oxide: % by mass) | | 2 | 2 | 2 | 2 | 2 | 2 | 2 |
| Composition ratio (at %) of metals in mixture | Al | 72.2 | 71.3 | 69.9 | 68.5 | 67.3 | 64.5 | 73.0 |
| | Zr | 17.2 | 16.9 | 16.6 | 16.3 | 16.0 | 15.3 | 17.3 |
| | Ce | 8.82 | 8.91 | 9.08 | 9.25 | 9.41 | 9.83 | 8.76 |
| | La | 0.90 | 1.96 | 3.49 | 4.97 | 6.39 | 9.35 | 0 |
| | Nd | 0.91 | 0.92 | 0.94 | 0.96 | 0.98 | 1.02 | 0.89 |
| Content (at %) of total amount of first and second additional elements (Nd + La) in inorganic oxide | | 1.81 | 2.88 | 4.43 | 5.93 | 7.37 | 10.37 | 0.89 |
| Content (C/CZ: at %) of cerium relative to total amount of cerium and zirconium | | 34.0 | 34.5 | 35.4 | 36.2 | 37.1 | 39.1 | 33.6 |
| NOx purification ratio | | 89.1 | 95.6 | 97.4 | 98.6 | 97.8 | 95.6 | 55.1 |
| HC-reforming ratio (%) | | 54.1 | 66.1 | 69.2 | 73.9 | 72.4 | 66.3 | 34.1 |
| Amount of OSC (μmol) | | 441.6 | 416.7 | 401.2 | 407.5 | 407 | 407.9 | 439.5 |

Now, comparing the catalyst for purification of exhaust gas (Example 13) in which the content of aluminum in the inorganic mixed oxide was 87.8 at % in terms of element content with the catalyst for purification of exhaust gas (Comparative Example 6) in which the content of aluminum in the inorganic mixed oxide was 91.7 at %, it is found that the catalyst for purification of exhaust gas for comparison (Comparative Example 6) was inferior in OSC performance. Such results showed that, for the purpose of exhibition of high catalytic performances in well-balanced manner, it is necessary to set the content of aluminum in the inorganic mixed oxide to 90 at % or less. Moreover, according to the results shown in FIG. 13 and FIG. 16, it was shown that the OSC performance depended on the content (C/CZ) of cerium, and that the efficiency thereof decreased as the C/CZ increased. It was also shown that, since the catalyst for purification of exhaust gas for comparison (Comparative Example 8) had the content (C/CZ) of cerium exceeding 50 at %, the OSC performance thereof was lowered. Such results show that it is necessary to set the content (C/CZ) of cerium to 50 at % or less.

As apparent from the results shown in Table 5 and FIGS. 17 to 19, it was found out that the catalysts for purification of exhaust gas of the present invention (Example 17 to 22) had a sufficiently high heat resistance, and were capable of exhibiting a high level of NOx purification performance, a high level of HC-reforming performance and a high level of OSC performance in a well-balanced manner even after the durability test. It was found out that the NOx purification performance and the HC-reforming performance were lowered in the catalyst for purification of exhaust gas (Example 22) in which the content of the total amount of the first and second additional elements was 10.37 at %, but the content of the first additional element was 9.35 at %. It is speculated that the performances were lowered because, in the catalyst for purification of exhaust gas obtained in Example 22, the content of the first additional element (La: the structure-stabilizing element) of the additional elements exceeded 9.0 at %, whereby the conversion into rhodium metal was rather inhibited.

Meanwhile, it was found out that the catalyst for purification of exhaust gas for comparison (Comparative Example 9) was not capable of exhibiting the NOx purification performance and the HC-reforming performance at high levels in a well-balanced manner. Regarding the catalyst for purification of exhaust gas (Comparative Example 9) in which the content of the total amount of the first and second additional elements was 0.89 at %, it was found out that the NOx purification performance and the HC-reforming performance were extremely low and that the heat resistance was not sufficient. It is speculated that such results were obtained because the catalyst for purification of exhaust gas obtained in Comparative Example 9 had an insufficient amount of the additional elements, and that the heat resistance was made insufficient especially because the first additional element (La: the structure-stabilizing element) of the additional elements was not contained.

Example 23 and Comparative Examples 10 to 14

Each inorganic mixed oxide, each catalyst for purification of exhaust gas and each mixed pellet catalyst were produced in the same manner as in Example 1, except that each component had a content shown in Table 6.

Comparative Example 15

A catalyst for purification of exhaust gas and a mixed pellet catalyst were produced in the same manner as in Example 1, except that a powder of a neodymium oxide was used as the support in place of the inorganic mixed oxide.

Figure 20:
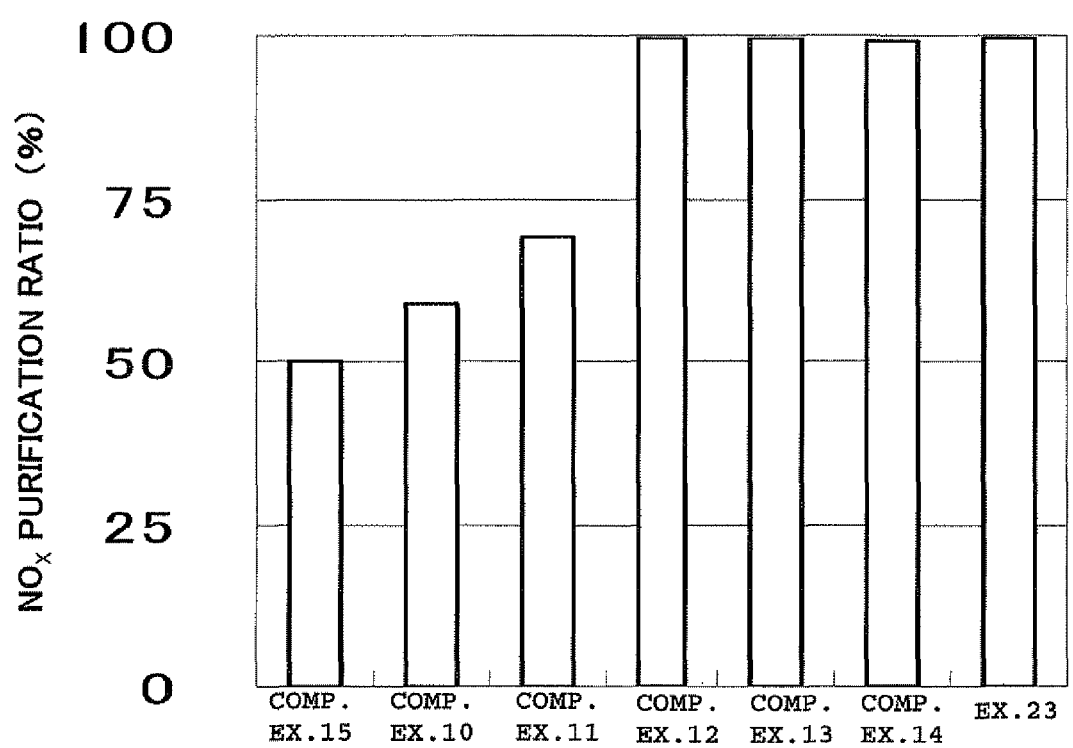
FIG. 20 is a graph showing NOx purification ratios of mixed pellet catalysts (Example 23 and Comparative Examples 10 to 15) after a durability test.
Figure 21:
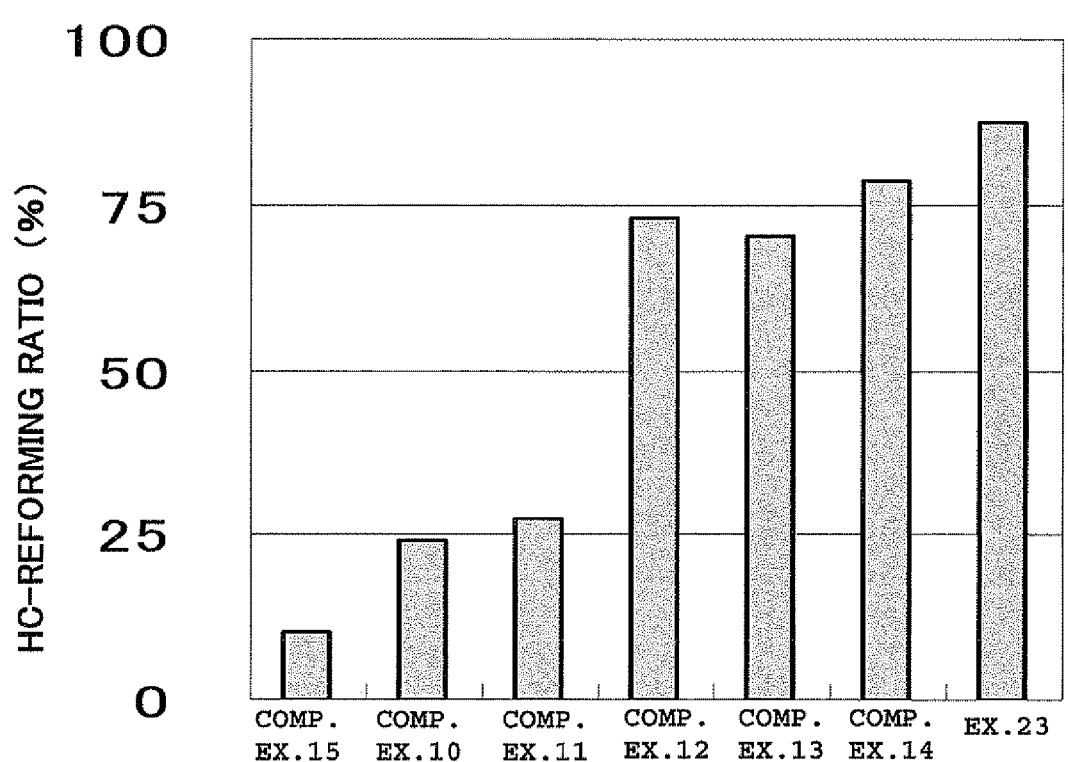
FIG. 21 is a graph showing HC-reforming ratios of the mixed pellet catalysts (Example 23 and Comparative Examples 10 to 15) after the durability test.

By use of the inorganic mixed oxides and the mixed pellet catalysts (Example 23 and Comparative Examples 10 to 15) obtained as described above, a heat-resistance test was performed by employing the same method as described above. Then, measurement of NOx purification ratios, and measurement of HC-reforming activities were performed. Table 6 and FIGS. 20 and 21 show the obtained results. Note that FIG. 20 is a graph showing the NOx purification ratio of each of the catalysts, and FIG. 21 is a graph showing the HC-reforming ratio of each of the catalysts.

a high level of NOx purification performance and a high level of HC-reforming performance even after the durability test. Meanwhile, it was found out that, when any one or two of essential elements, aluminum, zirconium and cerium, were not contained in the inorganic mixed oxide of the present invention, or when the inorganic mixed oxide without the enriched surface region formed was used as the support, the NOx purification performance and the HC-reforming performance were not successfully exhibited at high levels.

INDUSTRIAL APPLICABILITY

As has been described above, according to the present invention, provided are an inorganic mixed oxide and a catalyst for purification of exhaust gas using the same, the inorganic mixed oxide having a sufficiently excellent heat resistance, and being capable of, when used as a support of a catalyst, causing the catalyst to exhibit a high level of oxygen storage capability, a high level of HC-reforming activity and a high level of NOx purification performance in a well-balanced manner.

The invention claimed is:
1. A particulate inorganic mixed oxide comprising:
aluminum;
zirconium;
cerium;
lanthanum; and
an additional element selected from the group consisting of neodymium and praseodymium, wherein
a content of aluminum in the inorganic mixed oxide is 60 to 90 at %, in terms of element content, relative to a total amount of elements which form cations in the inorganic mixed oxide,
a content of cerium in the inorganic mixed oxide is 0.4 to 50 at %, in terms of element content, relative to a total amount of zirconium and cerium in the inorganic mixed oxide,

TABLE 6

| | | Example 23 | Comparative Example 10 | Comparative Example 11 | Comparative Example 12 | Comparative Example 13 | Comparative Example 14 | Comparative Example 15 |
|---|---|---|---|---|---|---|---|---|
| Number of moles of ions fed to solution (mol) | $Al_2$ | 200 | 0 | 0 | 200 | 200 | 200 | — |
| | Zr | 95 | 95 | 95 | 0 | 0 | 95 | — |
| | La | 5 | 5 | 5 | 17 | 17 | 5 | — |
| | Ce | 21 | 23 | 23 | 0 | 0 | 21 | — |
| Amount of second additional element relative to total amount of inorganic mixed oxide (amount of $Nd_2O_3$ in inorganic oxide: % by mass) | | 2 | 0 | 2 | 0 | 2 | 0 | — |
| Composition ratio (at %) of metals in mixture | Al | 76.1 | 0 | 0 | 95.9 | 95.3 | 77.2 | — |
| | Zr | 18.1 | 77.2 | 76.0 | 0 | 0 | 18.3 | — |
| | Ce | 4.00 | 18.7 | 18.4 | 0 | 0 | 4.05 | — |
| | La | 0.95 | 4.07 | 4.00 | 4.08 | 4.05 | 0.97 | — |
| | Nd | 0.84 | 0 | 1.60 | 0 | 0.67 | 0 | 100 |
| Content (at %) of additional elements (Nd + La) in inorganic oxide | | 1.79 | 4.07 | 5.6 | 4.08 | 4.72 | 0.97 | 100 |
| Content (C/CZ: at %) of cerium relative to total amount of cerium and zirconium | | 18.1 | 19.5 | 19.5 | — | — | 18.1 | — |
| NOx purification ratio | | 99.6 | 58.9 | 69.3 | 99.4 | 99.4 | 99.0 | 50.2 |
| HC-reforming ratio (%) | | 87.6 | 24.0 | 27.4 | 73.2 | 70.0 | 78.5 | 10 |

As apparent from the results shown in Table 6 and FIGS. 20 and 21, was found out that the catalyst for purification of exhaust gas of the present invention (Example 23) had a sufficiently high heat resistance and was capable of exhibiting a content of a total amount of lanthanum and the additional element is 1 to 12 at %, in terms of element content, relative to the total amount of the elements which form cations in the inorganic mixed oxide, at least 80% of primary particles of the inorganic mixed oxide have a particle diameter of 100 nm or less, at least a part of the primary particles have an enriched surface region where a content of the additional element is locally increased in a surface layer portion thereof, and an amount of the additional element in the enriched surface region is 0.1 to 0.95% by mass, in terms of oxide, relative to a whole amount of the inorganic mixed oxide.

2. The inorganic mixed oxide according to claim 1, wherein the additional element is neodymium.

3. The inorganic mixed oxide according to claim 1, wherein a content of lanthanum in the inorganic mixed oxide is 0.5 to 9 at % relative to the total amount of the elements which form cations in the inorganic mixed oxide.

4. The inorganic mixed oxide according to claim 1, wherein a content of the total amount of zirconium and cerium is 2.2 to 34.2 at %, in terms of element content, relative to the total amount of the elements which form cations in the inorganic mixed oxide.

5. A catalyst for purification of exhaust gas, wherein rhodium is supported on the inorganic mixed oxide according to claim 1.

6. The catalyst for purification of exhaust gas according to claim 5, wherein an amount of the rhodium supported is 0.01 to 1% by mass relative to the total amount of the inorganic mixed oxide.

* * * * *